US010398259B1

(12) United States Patent
Hetherington et al.

(10) Patent No.: US 10,398,259 B1
(45) Date of Patent: Sep. 3, 2019

(54) MARSHMALLOW ROASTING APPARATUS AND METHODS

(71) Applicant: John G. Posa, Ann Arbor, MI (US)

(72) Inventors: Michael Hetherington, Williamston, MI (US); John G. Posa, Ann Arbor, MI (US)

(73) Assignee: John G. Posa, Savannah, GA (US)

( * ) Notice: Subject to any disclaimer, the term of this patent is extended or adjusted under 35 U.S.C. 154(b) by 0 days.

(21) Appl. No.: 16/205,944

(22) Filed: Nov. 30, 2018

(51) Int. Cl.
*A47J 37/04* (2006.01)

(52) U.S. Cl.
CPC ........... *A47J 37/049* (2013.01); *A47J 37/041* (2013.01)

(58) Field of Classification Search
CPC .............................................. A47J 37/04–049
See application file for complete search history.

(56) References Cited

U.S. PATENT DOCUMENTS

| | | | |
|---|---|---|---|
| 2,183,938 A | 12/1939 | Lewis | |
| 2,315,143 A * | 3/1943 | Thompson | A47G 21/023 294/61 |
| 2,484,858 A | 10/1949 | Schmidt | |
| 2,487,651 A | 11/1949 | Gudmundsen | |
| 2,629,313 A | 2/1953 | Norville, Jr. | |
| 2,847,311 A | 8/1958 | Doumak | |
| 2,876,694 A | 3/1959 | Thomas | |
| 3,125,015 A * | 3/1964 | Schlaegel | A47J 37/042 475/11 |
| 3,744,403 A | 7/1973 | Castronuovo | |
| 3,745,910 A | 7/1973 | Delamater | |
| 3,927,609 A | 12/1975 | Scott | |
| 4,286,133 A * | 8/1981 | Einset | A47J 37/041 126/338 |
| 4,517,885 A | 5/1985 | Thompson | |
| 5,117,558 A | 6/1992 | Hull | |
| 5,906,052 A | 5/1999 | Harmon | |
| 6,009,796 A | 1/2000 | Larzik | |
| 6,196,121 B1 | 3/2001 | Crowl | |
| 6,877,232 B2 | 4/2005 | Harmon | |
| 7,219,936 B1 | 5/2007 | Willford | |
| 8,156,859 B2 | 4/2012 | Leason | |
| 8,387,519 B2 | 3/2013 | McGuigan | |

(Continued)

OTHER PUBLICATIONS

Cuisinarte® S'more to Love Roastin' Reel, downloaded from Bed Bath & Beyond website.
Spinmallow, downloaded from Amazon website.

*Primary Examiner* — Michael A Laflame, Jr.
(74) *Attorney, Agent, or Firm* — John G. Posa; Belzer PC

(57) ABSTRACT

Cooking of marshmallows and other food items uses simultaneous, multi-axial rotation for uniform browning over heat and open flame. The apparatus includes an elongate, hollow tube having proximal and distal ends, and a rod having proximal and distal ends disposed within the elongate hollow tube. A device coupled to the proximal end of the rod rotates the rod about a first axis of rotation. A first gear is attached to the distal end of the elongate hollow tube, and a second gear, coupled to the distal end of the rod, meshes with the first gear, causing the second gear to rotate about a second axis of rotation that is different from the first axis of rotation. A food item holder is attached to the second gear, such that when the rod rotates about the first axis of rotation, the food item holder simultaneously rotates about the first and second axes.

18 Claims, 21 Drawing Sheets

(56) References Cited

U.S. PATENT DOCUMENTS

| | | | |
|---|---|---|---|
| 2005/0284306 A1* | 12/2005 | Backus | A47J 37/042 99/427 |
| 2009/0071348 A1* | 3/2009 | Burns | A47J 37/049 99/421 R |
| 2009/0241784 A1 | 10/2009 | Colby | |
| 2010/0282096 A1* | 11/2010 | Fletcher | A47J 33/00 99/421 A |
| 2012/0152962 A1* | 6/2012 | Arbuckle | B25G 3/26 220/573.2 |
| 2018/0014691 A1* | 1/2018 | Gergen | A47J 37/049 |
| 2019/0082883 A1* | 3/2019 | Jones | A47J 37/0704 |
| 2019/0208959 A1* | 7/2019 | Fu | A47J 37/1266 |

\* cited by examiner

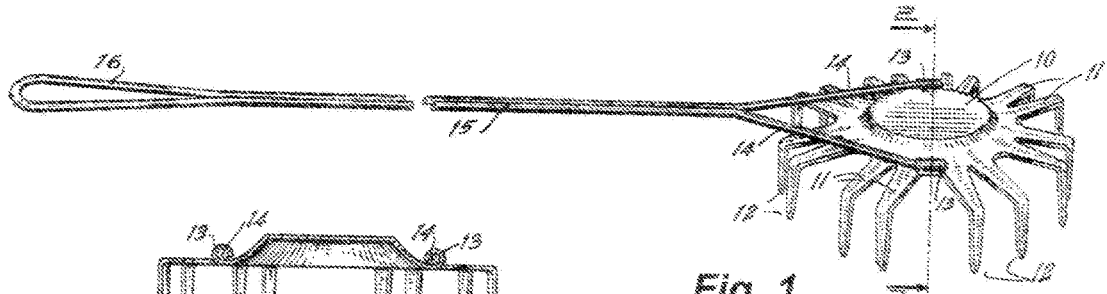
Fig. 1
(PRIOR ART)
Fig. 2
(PRIOR ART)
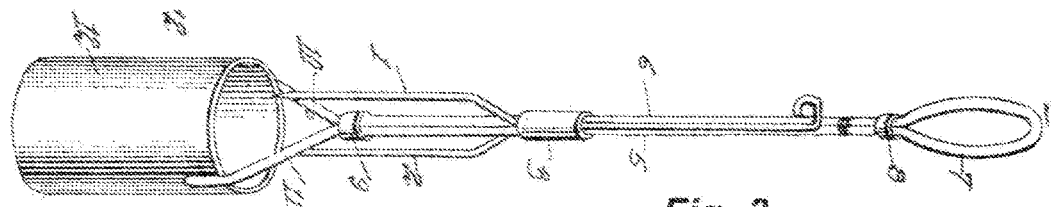
Fig. 3
(PRIOR ART)
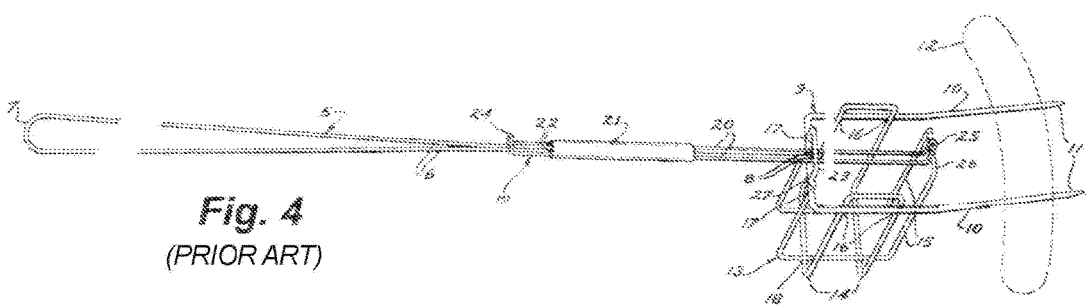
Fig. 4
(PRIOR ART)
Fig. 5
(PRIOR ART)
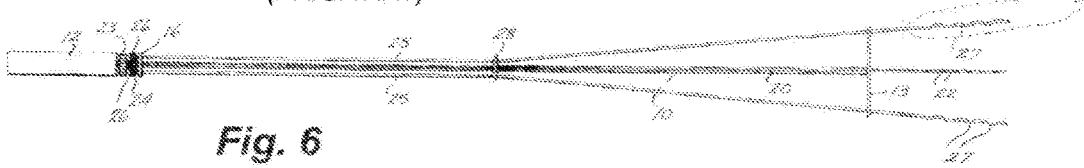
Fig. 6
(PRIOR ART)

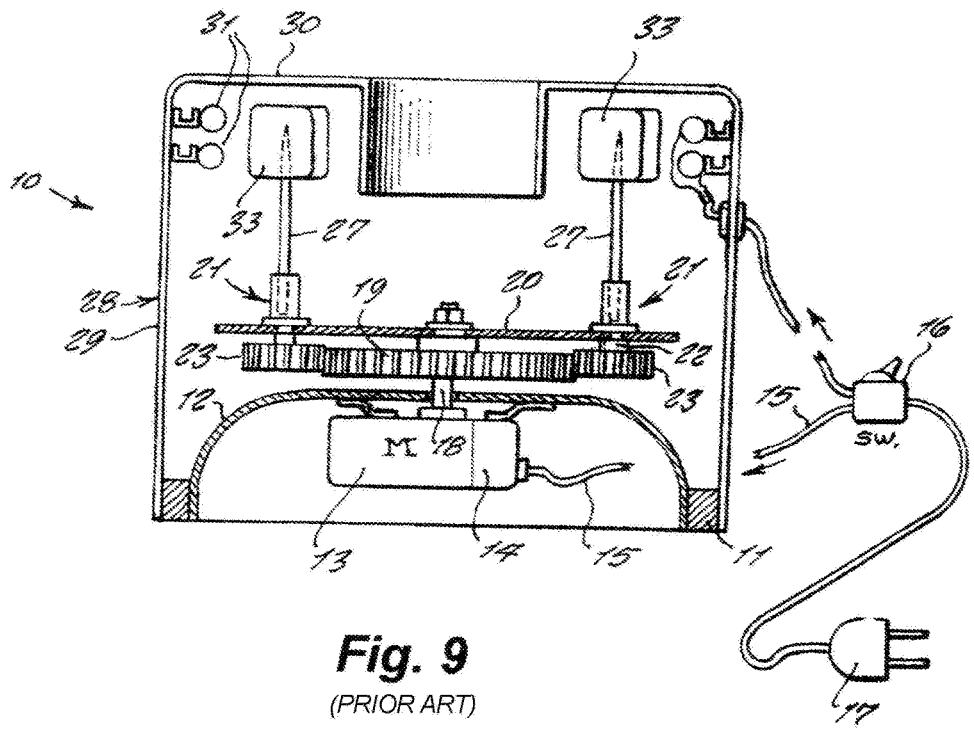
Fig. 9
(PRIOR ART)
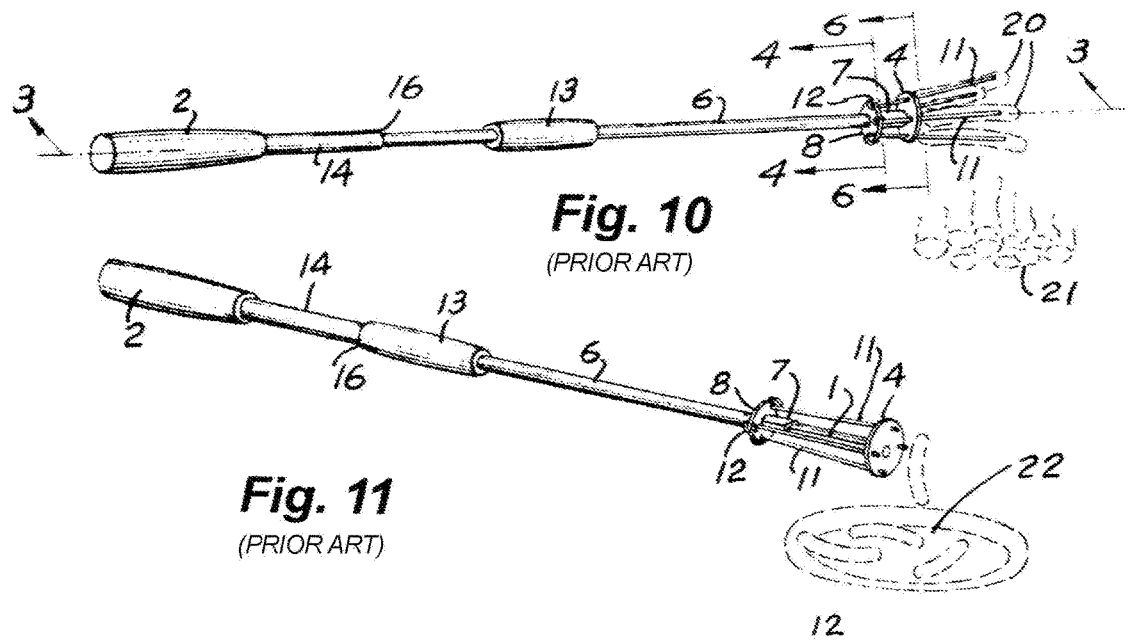
Fig. 10
(PRIOR ART)
Fig. 11
(PRIOR ART)

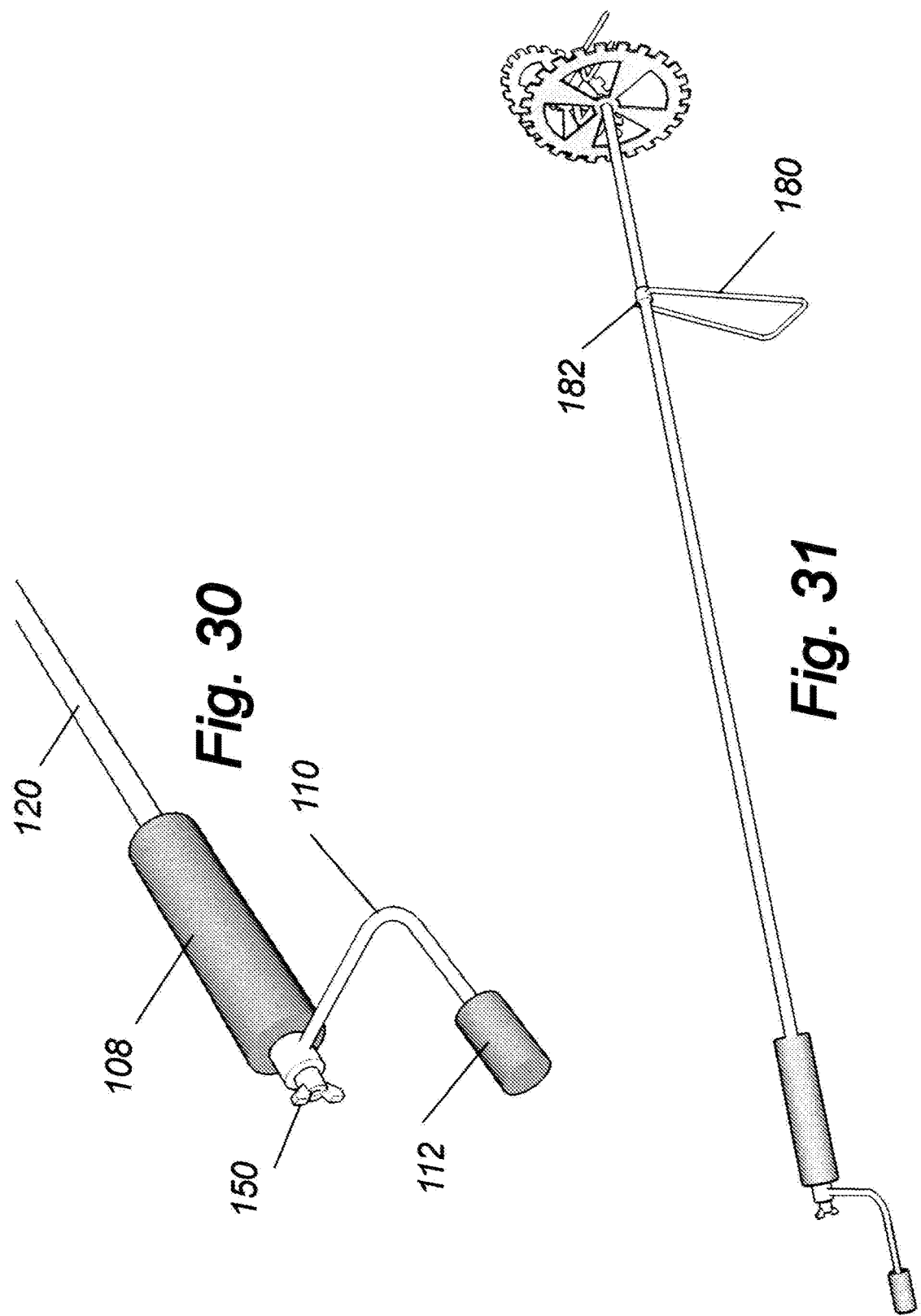

MARSHMALLOW ROASTING APPARATUS AND METHODS

FIELD OF THE INVENTION

This application relates generally to cooking utensils and, in particular, to apparatus and methods for roasting and toasting marshmallows and other food items over heat and open flames.

BACKGROUND OF THE INVENTION

Published U.S. Patent Application No. 2009/0241784 provides a comprehensive and well-written history of the marshmallow, and describes certain prior art relating to marshmallow toasting. According to this reference:

"Sources indicate that as early as 2000 BC, Egyptian people were the first to enjoy a confection now referred to as marshmallow. This ancient marshmallow treat was made from the mallow plant (*Athaea officinalis*) that grows wild in marshes. The Egyptians squeezed sap from the mallow plant and mixed it with nuts and honey. The French were introduced to marshmallows in the early to mid-1800's. Owners of small candy stores typically hand whipped sap from the mallow root and directed the same into a candy mold. In the late 1800's, candy makers started molding marshmallow via a modified cornstarch medium. At about this same time, candy makers replaced the mallow root with gelatin, which created a stable form of marshmallow.

"Marshmallows were introduced and popularized in the United States in the early 1900's, after the new manufacturing process was developed. In the mid-1900's, Alexander J. Doumak revolutionized the process for manufacturing marshmallows by developing and patenting an extrusion process, whereby combined marshmallow ingredients were extruded, cut into pieces, and packaged. (See, for example U.S. Pat. No. 2,847,311). In the 1950s, Jet-Puffed marshmallows by Kraft (currently doing business as Kraft Foods Inc. with corporate headquarters at Three Lakes Drive, Northfield, Ill., 60093) became extremely popular in the United States. Kraft employed a new technique, in which all ingredients were whipped together during the heating process. The marshmallow mass was then cooled slightly before being extruded. This, and the fact that the ingredients used are relatively cheap, allowed Kraft to make vast quantities of marshmallows inexpensively.

"A popular camping or backyard tradition is the toasting or roasting of marshmallows over a campfire or other source of an open flame. A marshmallow is typically placed on the end of a skewer type implement and held over the flame until it turns golden brown. This creates a caramelized outer skin with a somewhat liquefied layer deep to the outer skin. According to individual preference, the marshmallows are heated to various degrees—from a gentle toasting to burning the outer layer. Either the toasted marshmallow can be eaten whole or the outside layer may be consumed separately and the marshmallow toasted again."

It has been discovered that, under ideal roasting conditions, the temperature of the outside of the marshmallow should be between 180° F.-185° F./82° C.-85° C. An ideal internal temperature should be between 145° F.-160° F./63° C.-71° C. Many believe that dual-pronged roasting skewers are the best tool to keep the marshmallows from sliding around and possibly falling during roasting.

As might be expected, numerous marshmallow roasting devices have been developed to reach the elusive goal of a perfectly toasted specimen. For example, U.S. Pat. No. 2,183,938 (FIGS. 1, 2), which issued to Lewis, discloses a Marshmallow Toaster. The '938 Patent describes a culinary utensil essentially comprising a plate member; a series of pairs of arms projecting radially outward from the plate member, which arms are bent at right angles to form pairs at times; a handle; and means for detachably attaching the handle to the plate member.

U.S. Pat. No. 2,484,858 (FIG. 3) teaches a device for roasting marshmallows or the like comprising a pair of rods integral at one end to form a handle, clamps for holding the rods together, an oven, the lower ends of the rods being secured to the oven, a sleeve slidably positioned on the rods, a pair of prongs for holding marshmallows secured to the sleeve, and a handle on one of the prongs for moving the prongs and marshmallows into the oven preparatory to placing the oven in a fire for the roasting of the marshmallows.

U.S. Pat. No. 2,487,651 (FIG. 4) teaches a toaster comprising a handle and a basket-like enclosure on the handle of a shape and size for holding a marshmallow as it is toasted and wherein the marshmallow may be tumbled about by manipulation of the handle so that the marshmallow will be evenly toasted on all sides and will not stick to the enclosure."

U.S. Pat. No. 2,629,313 (FIGS. 5, 6) provides "a highly simplified, light and sturdy rotary roasting fork which will facilitate roasting wieners, marshmallows and the like evenly on all sides. The fork includes a plurality of separate rotatable prongs or tines, together with novel and simplified means for turning the tines simultaneously.

U.S. Pat. No. 2,876,694 (FIG. 7) relates to roasting sticks, and especially a stick for use in roasting wieners, marshmallows, corn, and the like, providing a lightweight rod of fairly considerable length presenting upon one of its ends a sharpened fork for piercing the concerned food article and upon the other end providing a means permitting the rod to be turned about its axis as roasting proceeds. Mounted upon the rod is a hand-grip characterized in that the same is a slidable along the length of the rod from a retracted position where at the rod can be comfortably supported during a roasting operation into an advanced position proximal to the fork for stabilizing the forked end while applying a food article to or removing the same from the prongs. The prongs may be wholly pocketed within the hand-grip when the hand-grip is advanced to the forward extreme of its sliding travel so that such hand-grip will then perform the function of a sheath and protect the prongs during periods when the roasting stick is not in use.

U.S. Pat. No. 3,125,015 (FIG. 8) describes a rotisserie wheel comprising a support member adapted for rotation in a vertical plane, a plurality of spits rotatably secured to the support member so that their major lengths extend therefrom in the same direction on a horizontal plane and in a concentric spaced relationship relative to the support member, a gear wheel carried by each respective spit, each of the gear wheels in mesh with at least one of the other wheels, a bearing member in axial alignment with and secured to the support member for rotation therewith, a spur gear carried by the bearing member, the bearing member susceptible of rotation independently of the spur gear, the support member adapted for mounting on a motor driven shaft for rotation therewith, a second gear wheel rotatably mounted to the support member in mesh with the spur gear and at least one of the first mentioned gear wheels, a pendulum secured at one end to the spur gear so as to depend therefrom, a weight means on the free end of the pendulum, and the pendulum being maintained in a depending relationship to the spur gear by gravity during rotation of the support member to thereby hold the spur gear against rotation.

U.S. Pat. No. 3,744,403 (FIG. 9) discloses an electrical appliance for toasting marshmallows comprising a housing having a base in which an electric motor driven by house current drives a gear train so to rotate a horizontal turntable that travels under a canopy that serves as an oven where electric heating elements are located, and the turntable supporting upright picks on each of which a marshmallow is impaled, each pick slowly rotating as the turntable turns, so that all sides of the marshmallow are faced to the oven heating elements during the toasting operation.

U.S. Pat. No. 3,745,910, "Roasting spit" (FIGS. 10, 11) "includes an elongated shaft of substantially square section, one end of the shaft is provided with a handle and the opposite end transversely secures a disk provided with transverse perforations adjacent the rim thereof. A round sleeve is slidable upon the square shaft, the sleeve provided with a handle for moving the sleeve, the opposite end of the sleeve being square sectioned and provided with a central disk of smaller diameter than the disk secured to the square shaft. A further sleeve is secured to the shaft handle and telescopically receives the round sleeve. Tines are secured to the small diameter disk and project through the perforations of the larger disk whereby the round sleeve handle is moved forwardly the tines flare beyond the larger disk, the tines being drawn inwardly of the larger disk when the sleeve handle is moved toward the shaft handle. Thus various food items such as wieners, may be impaled upon the tines whereby the food article may be roasted over a fire, the food articles being released from the tines when the sleeve is moved by its handle to retract the smaller diameter disk and to retract the tines."

U.S. Pat. No. 3,927,609, "Wienie wiggler roasting implement" (FIGS. 12, 13) discloses "a culinary implement for use in the roasting of wienies and consisting of a telescopic rod adapted to expand from an approximate 6 inch storage length to an approximate 30 inch usable length with a spring loaded retractable fork at one end thereof for use in the roasting of wienies, marshmallows, and the like, the fork being normally stored within the rod and telescopically movable there out of to expand to a general V shape for the roasting of two wienies or the like simultaneously or for the more secure gripping of a single wienie during the roasting process."

U.S. Pat. No. 4,517,885 (FIG. 14) describes "a wiener roaster having a shank including a first section threadably attached to a second section. A plurality of tines is integrally bound to the first section. A bearing collar rotatably slidably attaches to the first section. A first handle is bound to an end of the second section for gripping the wiener roaster. A second handle is slidably rotatably positioned about the second section in an area between the threadably securing point of the first section to the second section and the first handle. A stand is provided to be implanted in a ground. The stand has a structure defining a bifurcated bearing face wherein the bearing collar removably rotatably lodges as the tines impale wieners and is rotatably situated over a fire, or the like. A method for roasting wieners includes impaling at least one wiener on a tine pivotably secured at the end of a first shaft of a fold-up wiener roaster having a second shaft pivotably secured to the first shaft. The method additionally includes positioning the impaled wiener over a fire, or the like, and rotating the positioned impaled wiener over the fire to evenly roast the wiener."

The hand-held rotary barbecue rotisserie described in U.S. Pat. No. 5,117,558 (FIG. 15) "includes an elongated shaft having multiple prongs on which wieners, marshmallows, or other food is impaled for cooking. The shaft end opposite the cooking prongs is formed in to an eccentric crank handle, this crank is used for turning the cooking food. A heat insulting sleeve is placed on the shaft. This sleeve would typically be held in one hand while the other hand would rotate the crank handle. The shaft can be one single piece or can be separated into smaller components for easier storage."

U.S. Pat. No. 5,906,052 (FIG. 16) describes a "utensil which indicates when the inside of a marshmallow is melted includes a user-grippable handle (7) having a plurality of elongated wires (8) extending from one end for impaling a marshmallow for toasting. Wires (8) are flexible to be drawn together at open end for impaling marshmallow and are biased to return to their original position precisely when marshmallow is melted inside. The utensil would typically be held in users hand to toast marshmallow over open heat source."

U.S. Pat. No. 6,009,796 (FIG. 17) teaches a marshmallow toasting stick, particularly suited for camp fire use, including a substantially round wooden stick of a certain stick length and a certain cross-sectional stick diameter; a substantially round handle at a first end of the stick of a smaller handle length and a larger handle cross-sectional diameter. A taper is formed at a second end of the stick to a blunt point of still smaller cross-sectional diameter, with the handle color-coded for identifying the user of the stick, and with the stick and handle dimensions being selected so that one or more marshmallows could be suspended over the flames of a camp fire from a distance which protects an adult or child user from the heat of the fire.

U.S. Pat. No. 6,196,121 (FIG. 18) discloses a hand-held cooking utensil for safely holding and rotating food items when cooking upon an open fire. "The utensil includes a handle member including a housing having an open first end and a second end having an opening therethrough and further includes a protective heat shield member securely attached to the second end of the housing and also including an end cap member being removably attached to the housing for closing the open first end thereof; and also includes an elongate support member having a first end and a second end and being rotatably attached to the handle member; and further includes a coupler through which the first end of the elongate support member is journaled; and also includes prongs being spaced apart and each having a first end which is securely attached to the second end of the elongate support member with the prongs extending outwardly parallel to the elongate support member; and further includes a rotation assembly for rotating the elongate support member; and also includes a storage assembly for storing the elongate support member."

U.S. Pat. No. 6,877,232 (FIG. 19) describes a marshmallow-toasting utensil comprising a handle and a wire assembly with at least one wire segment extending from the handle. In some embodiments, the wire assembly includes deflectable wire segments with end regions that are biased to a spread-apart configuration. During use, the end regions are urged together and a marshmallow is impaled upon the ends. As the inside of the marshmallow melts, the end regions return toward the unbiased configuration. In some embodiments, the utensil is a collapsible utensil where the wire assembly is selectively positionable between at least extended and collapsed configurations. In some embodiments, the wire segments are adapted to pivot between the stowed and extended configurations. In some embodiments, the wire segments are selectively removable from the handle. In some embodiments, the wire segments are selectively extendable from and/or stored within the handle.

U.S. Pat. No. 7,219,936 (FIG. 20) resides in a hand-held rotatable campfire rotisserie. The device features the ability to rotate the tined end from the handle end internally. The length of the overall device allows the user to roast items placed over a heat source at a comfortable distance from the heat source. The rotisserie action allows the food items to cook evenly.

The Girl Scout Handbook of 1927 is the first publication to provide a recipe for roasted marshmallow combined with chocolate bars and graham crackers, now known as a s'more. The graham crackers add flavor, but mainly provide a crispy texture to the treat. They hold in the sticky ingredients, creating a sandwich that helps to keep the hands clean. The perfect chocolate in a s'more will have flavor without overpowering the marshmallow and the graham cracker, and should melt readily without becoming too liquid.

S'mores have been a campfire favorite in the U.S. and Canada since the 1920s. Since that time, numerous inventions related to s'more making have been described and invented. U.S. Pat. No. 8,156,859 (FIG. 21) is directed to a machine for toasting a marshmallow loaded on a pick and concurrently melting at least a portion of a chocolate bar provided on a separate support. A housing has an internal heat source, a rotatable pick holder shaped to removably and securely receive a pick and support the marshmallow in proximity to the heat source, and a coupling to rotate a so engaged pick. The coupling can be a manual control gearingly coupled to the pick holder. A moveable cover can support the heat source and place it in proximity with a marshmallow-bearing portion of the pick when in a closed position yet move aside for loading and unloading ingredients. A method for making s'mores toasts marshmallows while actively melting chocolate and provides for selective rotation of the marshmallow within the housing during the toasting step by moving a control that is safely disposed exterior of the housing.

U.S. Pat. No. 8,387,519, entitled "marshmallow roasting stick," (FIG. 22) relates to skewers or sticks used to roast marshmallows and, in particular to a skewer or stick adapted to retain edible wafers on the skewer or stick for selective combination with a roasted marshmallow. The apparatus includes a shaft having a first end adapted to receive an edible wafer via an internal opening in the wafer, a second end, and a retaining portion near the second end that is adapted to removably retain the edible wafer to the shaft. The first end has a first shape adapted to enable the wafer to travel along the first end of the shaft towards the retaining portion with the retaining portion having a second shape different from the first shape and adapted to removably engage the wafer when moved from the first end to the retaining portion such that the shaft may be tilted down relative to the second end without the wafer traveling due to gravity beyond the retaining portion.

The roasting apparatus described in U.S. Pat. No. 8,387,519 includes a shaft having a first end adapted to receive an edible wafer via an internal opening in the wafer, a second end, and a retaining portion near the second end that is adapted to removably retain the edible wafer to the shaft. The first end has a first shape adapted to enable the wafer to travel along the first end of the shaft towards the retaining portion with the retaining portion having a second shape different from the first shape and adapted to removably engage the wafer when moved from the first end to the retaining portion such that the shaft may be tilted down relative to the second end without the wafer traveling due to gravity beyond the retaining portion.

Published U.S. Pat. App. No. 2010/0282096 shown in FIG. 24 is directed to a campfire-cooking utensil that can be used to cook food over campfires, that rotates the food about an axis of rotation, and can cook four food items at one time. The utensil that has a curved handle or shaft to provide for easier holding or placement of the utensil, similar to the curved handle snow shovels.

There are also many commercially available marshmallow roasting sticks, including battery-operated units that rotate the marshmallow with the push of a button (FIG. 25). The "Spinmallow" has a telescoping arm, LED flashlight, and rotates at an ideal speed of 186 RPM (FIG. 26).

Despite all of these advances, however, the need remains for a device capable of achieving a perfectly toasted marshmallow having a crisp, evenly browned—but not burned—exterior with a warm, soft, gooey center.

SUMMARY OF THE INVENTION

This invention resides in apparatus for cooking a food item over heat and open flame. While the preferred embodiments are directed to the perfectly roasted marshmallow, the invention is equally applicable to other meats including wieners, dogs, brats, veggies, chestnuts, and so forth, especially if cut to size.

The apparatus includes an elongate hollow tube having proximal and distal ends, and a rod having proximal and distal ends disposed within the elongate hollow tube. A device coupled to the proximal end of the rod rotates the rod about a first axis of rotation. A first gear is attached to the distal end of the elongate hollow tube, and a second gear, coupled to the distal end of the rod, meshes with the first gear, causing the second gear to rotate about a second axis of rotation that is different from the first axis of rotation. A food item holder is attached to the second gear, such that when the rod rotates about the first axis of rotation, the food item holder simultaneously rotates about the first and second axes of rotation.

In accordance with one preferred embodiment, the distal end of the rod includes a bent portion that terminates in a sleeve with a bore defining the second axis of rotation, and the second gear is attached to a second rod disposed within the sleeve, such that the first and second axes may intersect within a central region of the food item. The second rod has opposing ends that protrude from the sleeve, and the second gear may be connected to one end of the second rod, with the food item holder being connected to the other end of the second rod. Alternatively, the second gear and the food item holder may be connected to the same end of the second rod.

The first and second axes of rotation may be parallel, perpendicular or at other angles to one another. The first and second gears may be flat with square, trapezoidal, or wavy teeth. Alternatively, the first gear may be cup-shaped, having a rim with teeth and a concave surface facing toward the food item holder. In this instance the second gear may be a spur gear that meshes with teeth on the rim of the cup. The apparatus may include a plurality of second gears that mesh with the first gear, each second gear being coupled to a respective food item holder.

The device coupled to the proximal end of the rod to rotate the rod about a first axis of rotation may be a hand crank, a motor, or a squeeze grip coupled to a ratcheting mechanism. The food item holder may be a fork or a wire cage or basket. The gear ratio between the first and second gears may be equal to, greater than or less than 1:1. A battery operated drive unit may be used, controlled by buttons or a wireless remote control. With available power, the apparatus may include an LED illuminator to enhance visibility, and/or a temperature sensor and/or colorimeter to determine level of degree of roasting or browning. A temperature sensor may also be including in the tine of the fork and, as a further option, particularly with temperature sensing capabilities, the handle may include a wireless communications interface enabling unattended roasting.

BRIEF DESCRIPTION OF THE DRAWINGS

FIG. 1 is an oblique view of a prior-art marshmallow toaster;

FIG. 2 is a front, end-on view of the device of FIG. 1;

FIG. 3 shows a prior-art device for roasting marshmallows or the like comprising a pair of rods integral at one end to form a handle and clamps for holding the rods together;

FIG. 4 illustrates a prior-art marshmallow toaster comprising a handle and a basket-like enclosure on the handle wherein the marshmallow may be tumbled about by manipulation of the handle so that the marshmallow will be evenly toasted on all sides and will not stick to the enclosure;

FIG. 5 is a side view of a prior-art roasting fork for wieners, marshmallows and the like including a plurality of separate rotatable prongs or tines, together with means for turning the tines simultaneously;

FIG. 6 is a top-down view of the fork of FIG. 5;

FIG. 7 is a drawing of a prior-art roasting stick for use in roasting wieners, marshmallows, corn, and the like;

FIG. 9 illustrates a prior-art electrical appliance for toasting marshmallows including a turntable supporting upright picks on each of which a marshmallow is impaled, each pick slowly rotating as the turntable turns, so that all sides of the marshmallow are faced to the oven heating elements during the toasting operation;

FIG. 10 shows a prior-art roasting spit whereby various food items such as wieners may be impaled upon the tines and roasted over a fire, with the food articles being released from the tines when the sleeve is moved by its handle to retract the smaller diameter disk and to retract the tines;

FIG. 11 shows the food items are released using the device of FIG. 10;

FIG. 30 is detail view of a manually operable handle portion of the preferred embodiment;

FIG. 31 illustrates an optional hinged support stand;

DETAILED DESCRIPTION OF THE INVENTION

Figure 7:
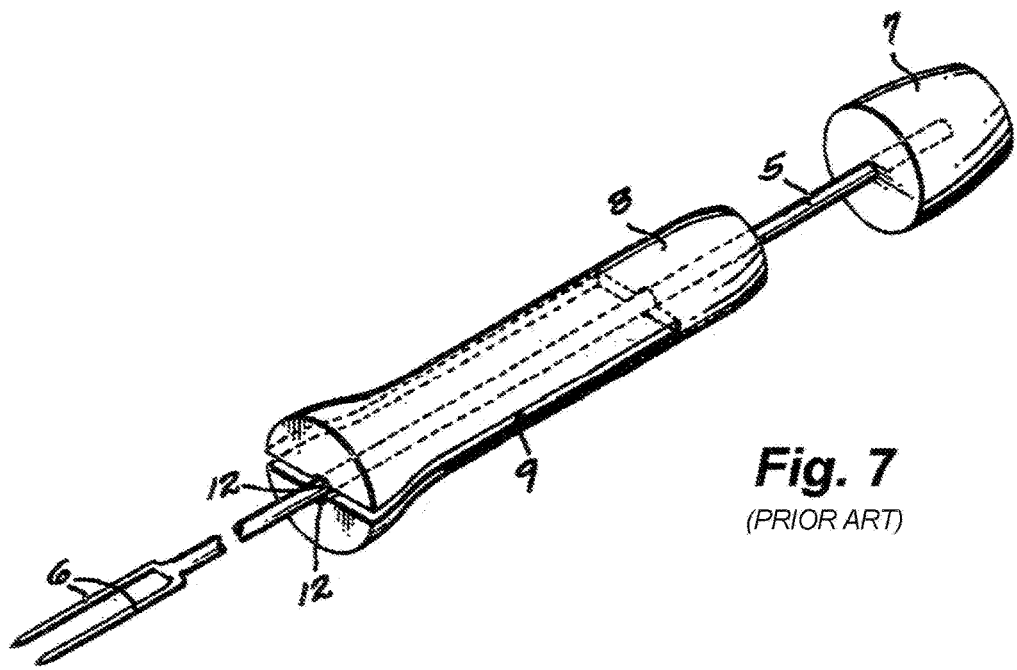
Figure 8:
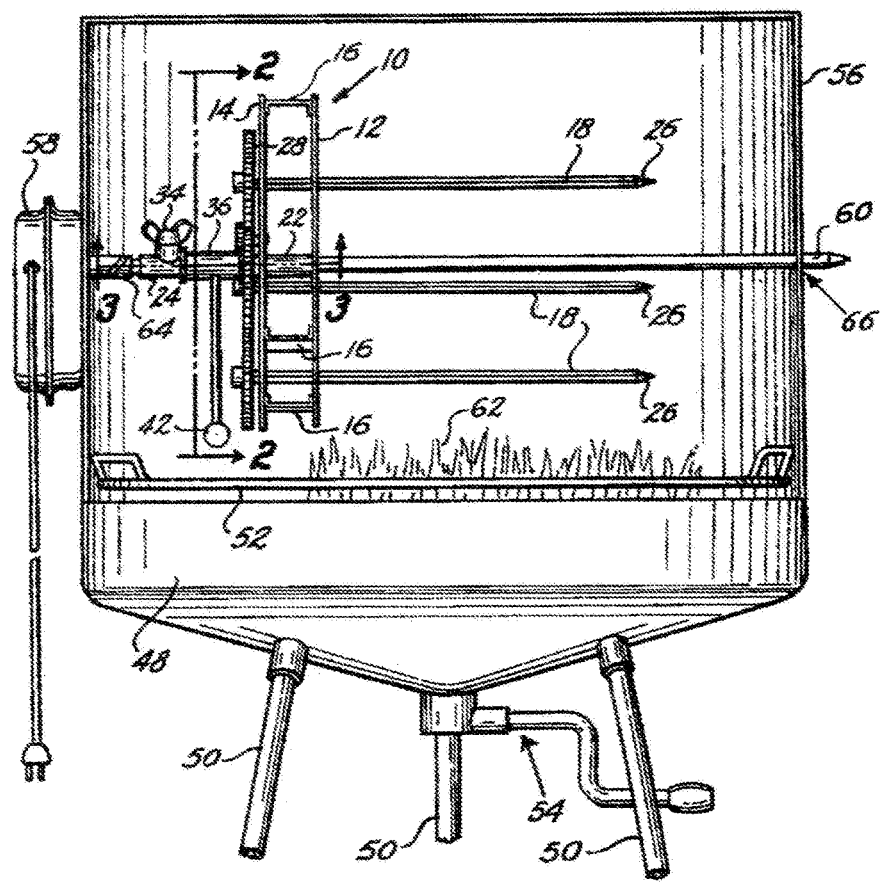
FIG. 8 shows a prior-art rotisserie wheel including a support member adapted for rotation in a vertical plane.
Figure 12:
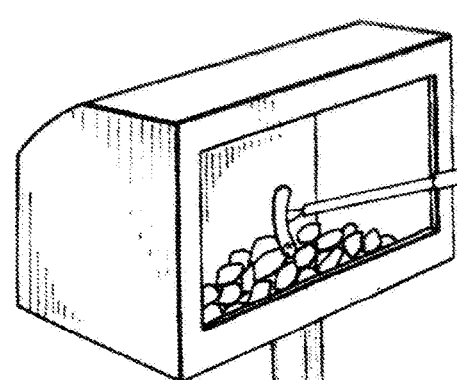
FIG. 12 depicts a prior-art culinary implement consisting of a telescopic rod adapted to expand from an approximate 6 inch storage length to an approximate 30 inch usable length with a spring loaded retractable fork at one end thereof for use in the roasting of wienies.
Figure 13:
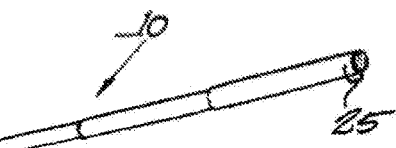
FIG. 13 illustrates the distal end of the implement of FIG. 12.
Figure 14:
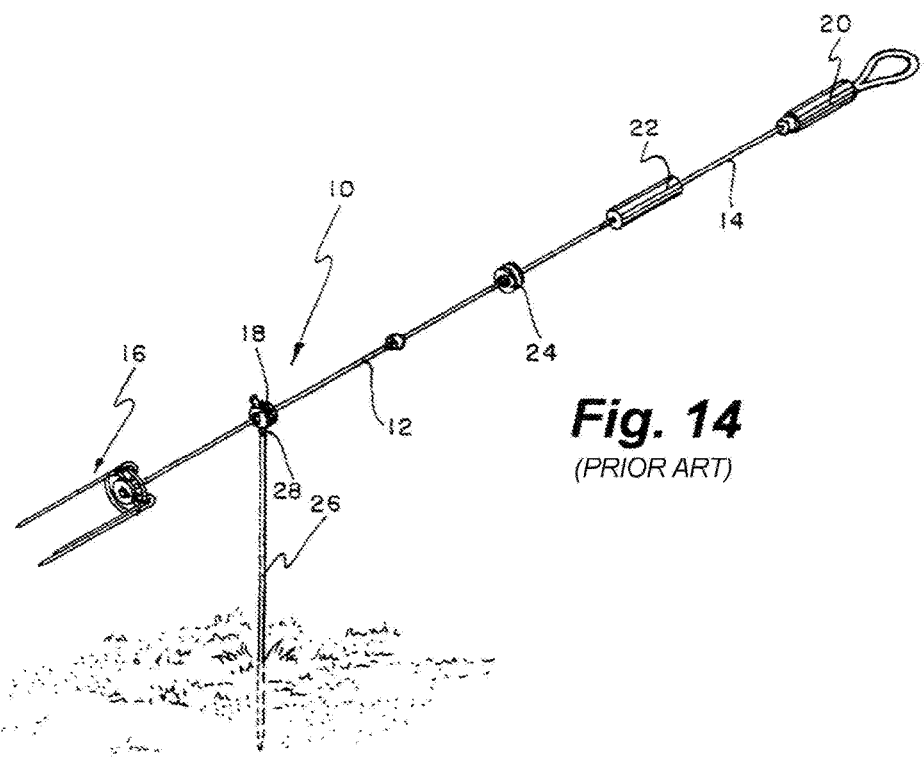
FIG. 14 shows a prior-art wiener roaster having a plurality of tines, a first handle for gripping the wiener roaster, a second handle that is slidably and rotatably positioned, and a stand to be implanted in a ground.
Figure 15:
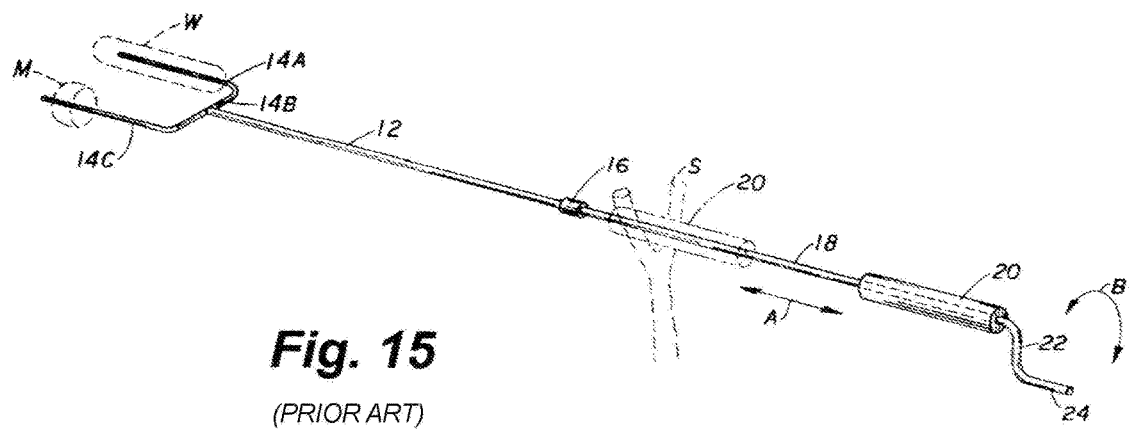
FIG. 15 is a drawing that shows a prior-art, hand-held rotary barbecue rotisserie including an elongated shaft having multiple prongs on which wieners, marshmallows, or other food is impaled for cooking.
Figure 16:
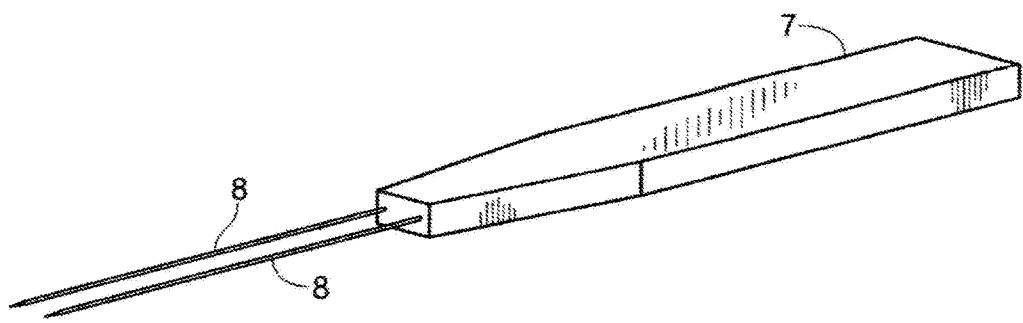
FIG. 16 is a prior-art utensil which indicates when the inside of a marshmallow is melted. The utensil would typically be held in users hand to toast marshmallow over open heat source.
Figure 17:
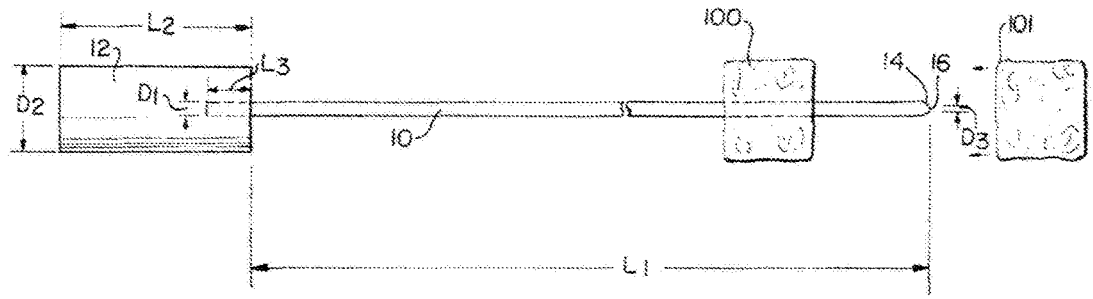
FIG. 17 illustrates a marshmallow toasting stick, with the stick and handle dimensions being selected so that one or more marshmallows could be suspended over the flames of a camp fire from a distance which protects an adult or child user from the heat of the fire.
Figure 18:
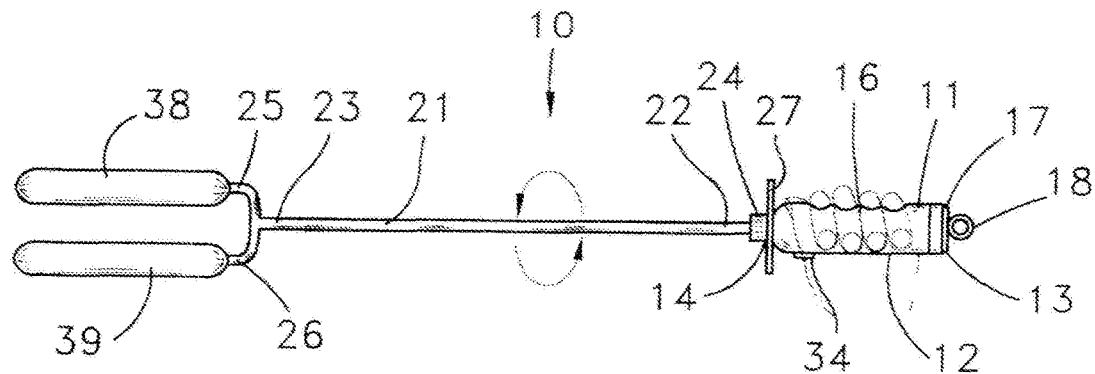
FIG. 18 shows a prior-art hand-held cooking utensil for safely holding and rotating food items when cooking upon an open fire.
Figure 19:
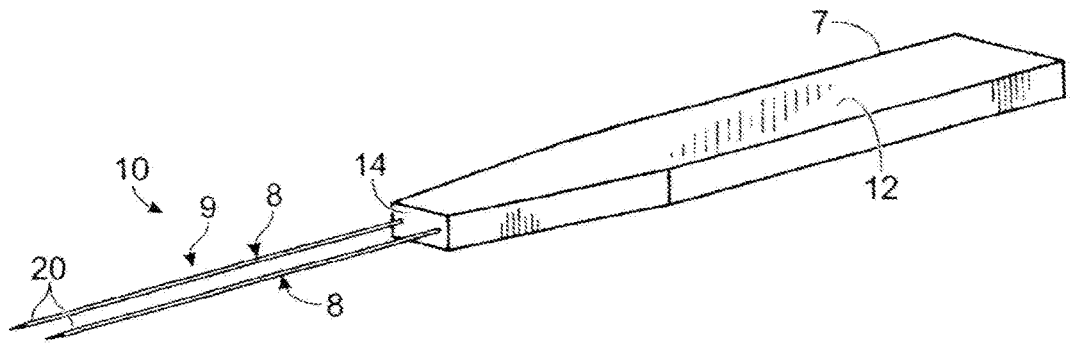
FIG. 19 depicts a prior-art marshmallow-toasting utensil comprising a handle and a wire assembly with at least one wire segment extending from the handle.
Figure 20:
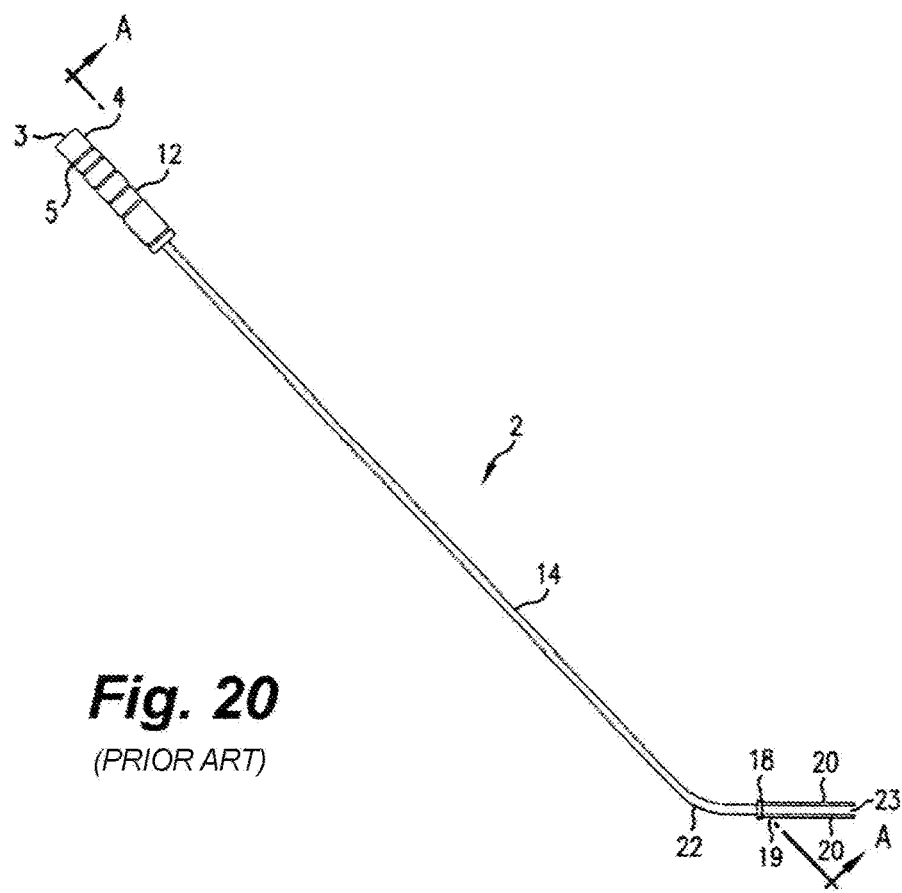
FIG. 20 illustrates a prior-art hand-held rotatable campfire rotisserie having a length that allows the user to roast items placed over a heat source at a comfortable distance from the heat source, and wherein the rotisserie action allows the food items to cook evenly.
Figure 21:
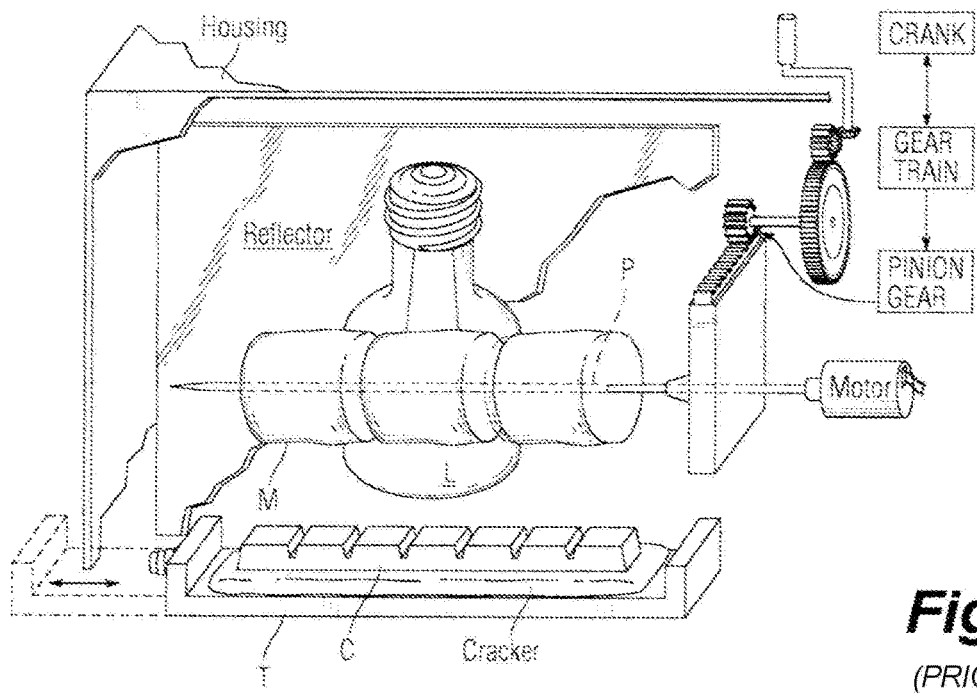
FIG. 21 relates to s'mores, being directed to a prior-art machine for toasting a marshmallow loaded on a pick and concurrently melting at least a portion of a chocolate bar provided on a separate support.
Figure 22:
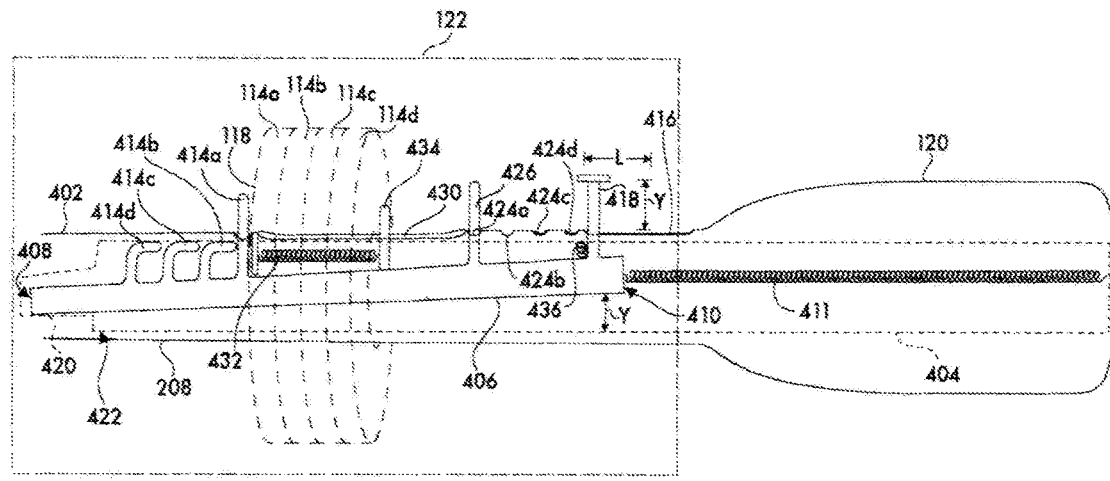
FIG. 22 shows a prior-art marshmallow roasting skewer or stick adapted to retain edible wafers on the skewer or stick for selective combination with a roasted marshmallow.
Figure 23:
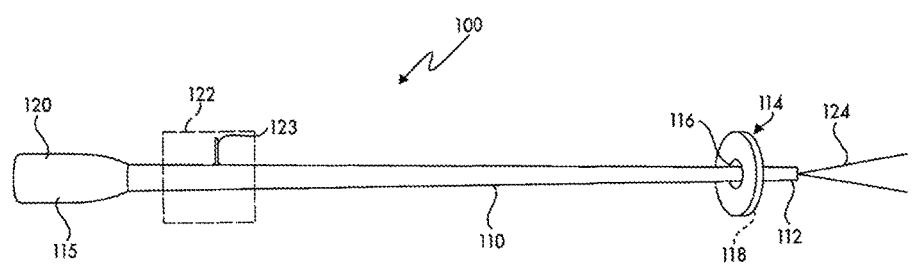
FIG. 23 depicts a prior-art roasting apparatus including a shaft having a first end adapted to receive an edible wafer via an internal opening in the wafer, a second end, and a retaining portion near the second end that is adapted to removably retain the edible wafer to the shaft.
Figure 24:
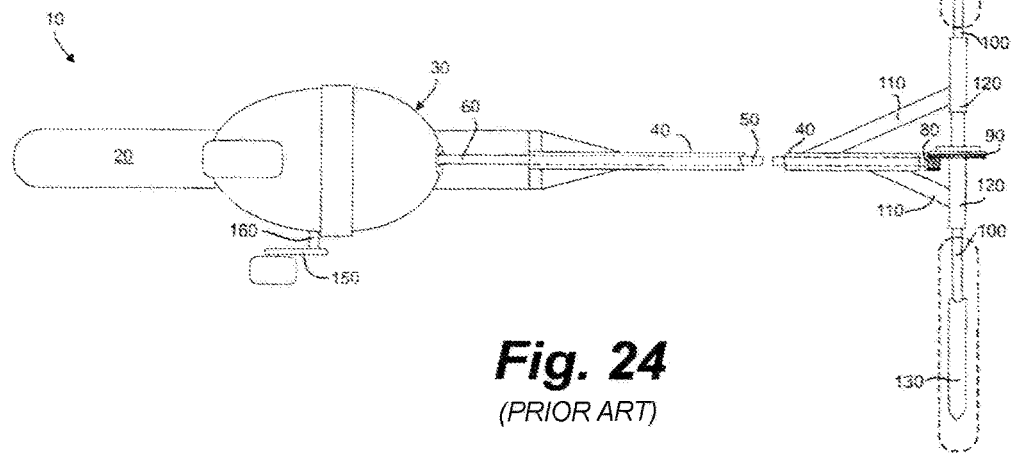
FIG. 24 shows a prior-art campfire-cooking utensil that can be used to cook food over campfires, that rotates the food about an axis of rotation, and can cook four food items at one time.
Figure 25:
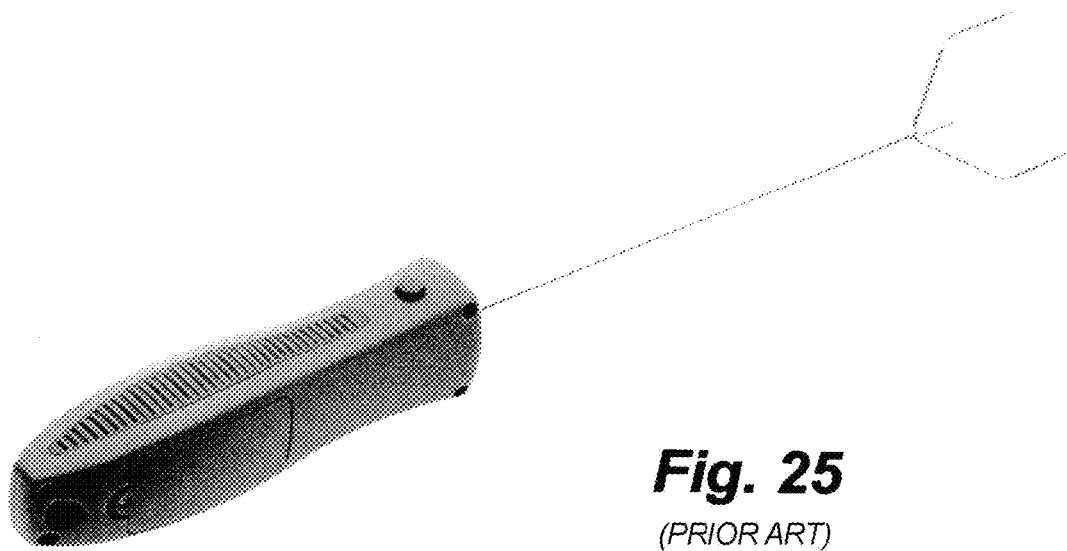
FIG. 25 illustrates a prior-art battery-operated unit that rotate a marshmallow with the push of a button.
Figure 26:
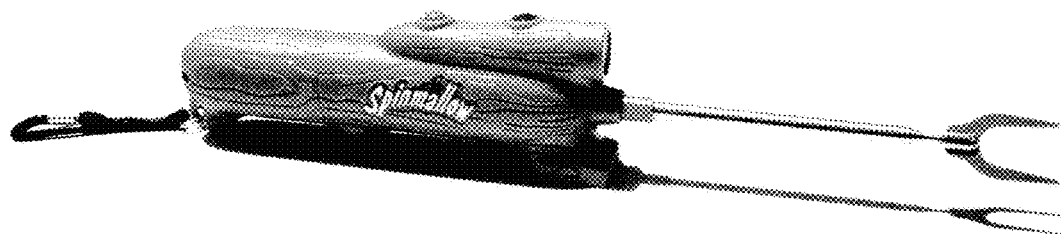
FIG. 26 shows a prior-art "Spinmallow" that has a telescoping arm, LED flashlight, and rotates at an ideal speed of 186 RPM.
Figure 27:
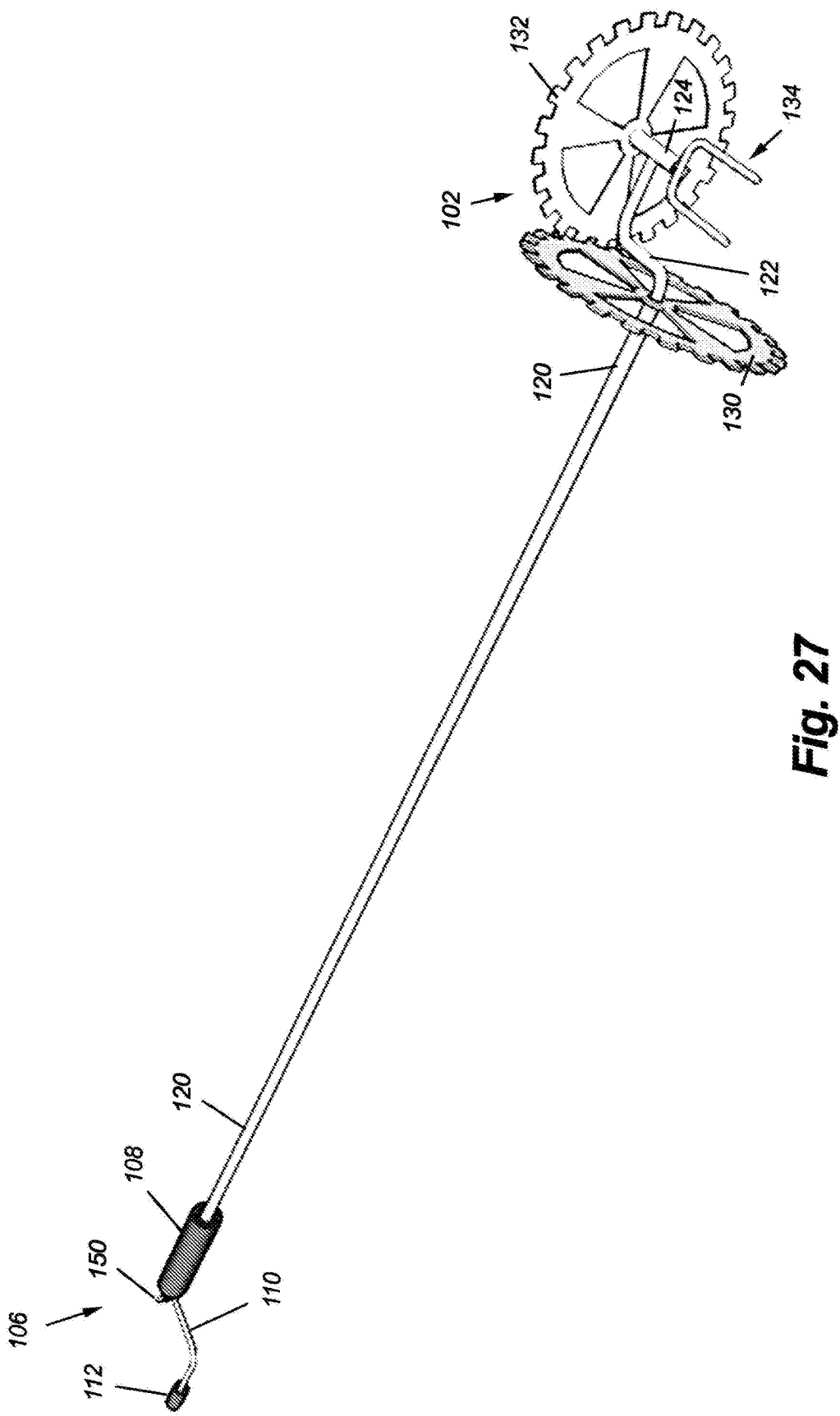
FIG. 27 is an oblique view of a preferred embodiment of the invention that facilitates multi-axis rotation for an evenly roasted product.

FIG. 27 is a drawing that illustrates a preferred embodiment of the invention, seen from an oblique perspective. The apparatus includes a distal multi-rotational head unit 102, a shaft portion 104 and a proximal drive unit 106. The drive unit shown in FIG. 27 is manually operated, including a first gripping portion 108 and a rotatable handle 110. The length of the shaft portion of the apparatus is preferably in the range of one to three feet or greater, with longer lengths being more preferred to keep the user removed from the heat source, which may be a campfire or bonfire. To ease transport, the shaft portion may be disassembled through one or more detachable couplings, and/or the shaft portion may be telescoping.

Figure 28:
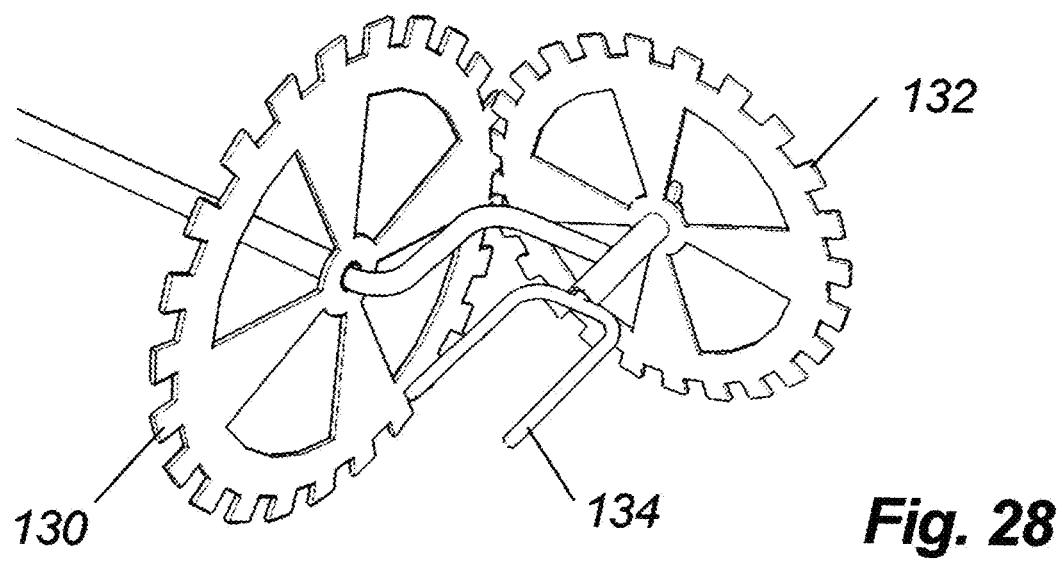
FIG. 28 is a detail view of the multi-axis rotation head unit seen from a first perspective.

FIG. 28 is a detail view of the multi-rotational head unit seen from a first perspective. Shaft portion 104 comprises an elongate hollow tube 120 having proximal and distal ends, and a rod rotatable about a first axis of rotation disposed within the hollow tube. Upon exiting the distal end of tube 120, rod 122 undergoes one or more off-axis bends, terminating in an attachment to a sleeve 124 defining a second axis of rotation. In preferred embodiments, the first and second axes of rotation are perpendicular to one another.

A first gear 130 is attached to the distal end of the hollow tube 120, such that during operation of the device, gear 130 does not rotate. A shorter rod, not very visible in the Figure, has a first end attached to a second gear 132 configured to mesh with the first gear 130, and a second end transitioning into a food holder 134, preferably a multi-pronged fork. During operation, as the proximal drive unit is activated, and with first gear 130 remaining stationary, gear 132 "walks around" gear 130 as the respective teeth mesh, causing fork 134 to rotate about the second axis through collar 124. As the same time, the second axis rotates in a plane different the first axis, resulting in a multi-dimensional movement of the marshmallow or other food item disposed on or in the food carrier.

This multi-dimensional motion leads to a uniform exposure to the heat source not possible with prior-art devices, and an unprecedented degree of toasted goodness. The tumbling motion also assists with retaining the softening marshmallow on the skewer, preventing the all-too-common catastrophic loss of the morsel at the peak of perfection in a campfire, for example.

Figure 29:
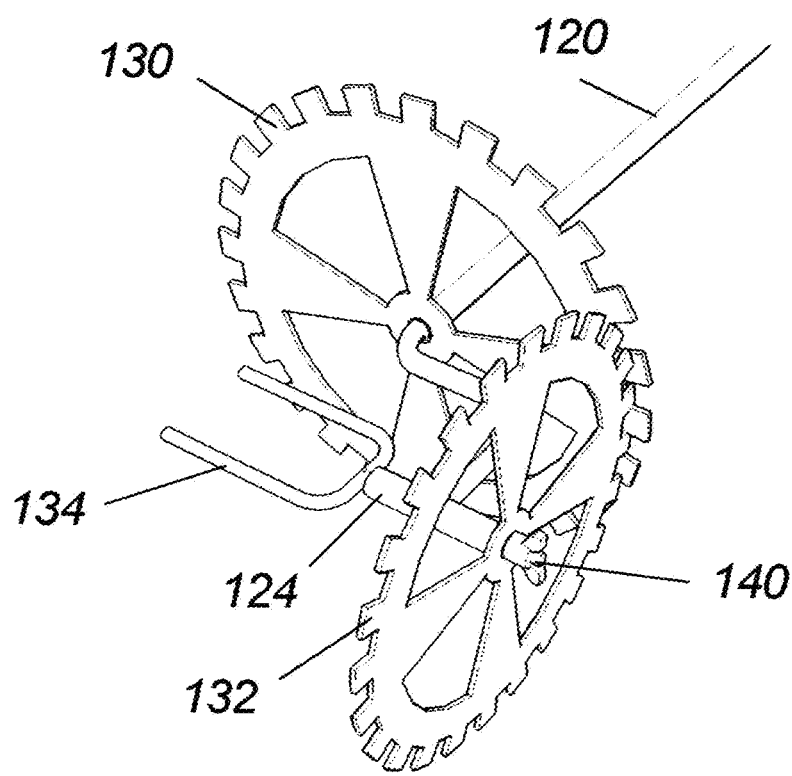
FIG. 29 is a detail view of the multi-axis rotation head unit seen from a second perspective.

FIG. 29 is an oblique view head mechanism of the invention seen from a different perspective. Note further that while the gears shown in FIGS. 28, 29 are approximately the same size, establishing a 1:1 gear ratio, this ratio may be modified in accordance with the invention to cause fork to spin at a faster or slower rate relative to the rotation about the shaft axis as the drive mechanism is activated.

In terms of materials, metals are preferably used for components exposed to heat or flame. While all such components are preferably constructed from stainless steel, other materials may be used to reduce manufacturing costs. For example, shaft 120, rod 122 and sleeve 124 may be aluminum or non-stainless steel. The gear 130, 132 may also be non-stainless steel, though the fork 134 or other food carrier is preferably stainless for cleanliness. Gears 130, 132 may be made with stamping or cutting via mechanical die, laser or water jet. The gear material is preferably a heavier-gauge sheet metal such as 12- or 10-gauge to resist warping due to frequent heat treatment in open fires.

Referring back to FIG. 29, the preferred embodiment the fork is maintained in collar 124 with a thumb screw 140 or other fastener enabling that portion of the mechanism to be disassembled for cleaning, as it is anticipated that over time the gears in particular may become covered with marshmallow goo. As seen in detail view of FIG. 30, handle 110 is also preferably attached to the rod 122 through a thumb screw 150 or other fastener enabling the rod to be pulled from shaft 120 for easy cleaning.

Many options are possible with the invention in accordance with alternative embodiments. For example, as shown in FIG. 31, the apparatus may come equipped with a fold-out stand 180 for accurate positioning in a fire. The stand may be telescoping (not shown), and may also be adjustable with fastener 182 facilitating removal and or repositioning along shaft portion 104.

Figure 32A:
FIG. 32A shows a triangular gear applicable to the invention.
Figure 32B:
FIG. 32B shows a trapezoidal gear applicable to the invention.
Figure 32C:
FIG. 32C shows a wavy or rounded gear applicable to the invention.
Figure 32D:
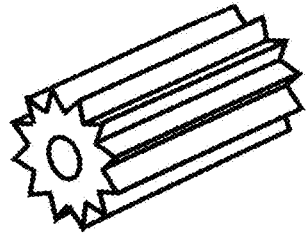
FIG. 32D shows a spur gear applicable to the invention.

While square gear teeth have so far been shown in the drawings, other types of gears are possible in all embodiments, including triangular (FIG. 32A); trapezoidal (FIG. 32B); and wavy/rounded/sinusoidal (FIG. 32C). Spur gears (FIG. 32D) may also be used in some embodiments described below. Further, while a hand crank has been shown at the proximal end of the apparatus, a battery-operated motor (FIG. 33A) or a squeeze-ratchet mechanism (Figure (FIG. 33B) may be alternatively be used.

Figure 33A:
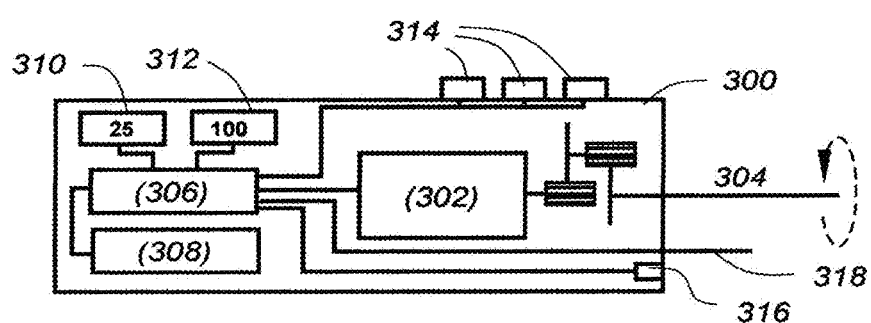
FIG. 33A illustrates an alternative battery-powered motor drive.

In FIG. 33A, an electric drive may include a hand-held enclosure 300 including a motor 302 powered by batteries 308 which may be rechargeable. The motor turns a shaft 304 disposed within the elongated tube to the head unit, preferably through a series of gears for speed control. Speed may also be electrically controlled by controller 306 using one or more of the buttons 314. The hand-held unit may include one or more displays 310, 312, to indicate rotational speed and/or food temperature. Functions may be performed with a controller 306, which may receive a signal from a temperature sensor (not shown) along line 318, and may further include an LED light 316, activated by one of the button 314 shown.

If a battery operated drive unit and support frame are used, the drive unit may be operated with a wireless remote control unit. With available power, the apparatus may include an LED illuminator to enhance visibility, and/or a temperature sensor and/or colorimeter may be used to determine a desired level of degree of roasting or browning. A temperature sensor may also be included in the tine(s) of the fork(s) for interconnection to a temperature readout.

Figure 33B:
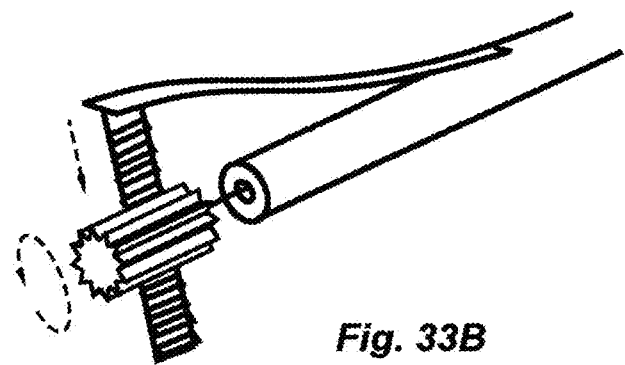
FIG. 33B illustrates an alternative ratcheting drive mechanism.

The squeeze-activated rotation mechanism of FIG. 33B may include a lever 332 coupled to a gear 334 through a ratchet bar 336, such that pressing on the lever turns the rod journaled in the elongated tube 338.

Figure 34A:
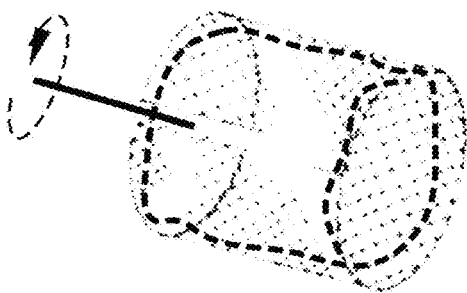
FIG. 34A shows a food holder in the form of a cage.
Figure 34B:
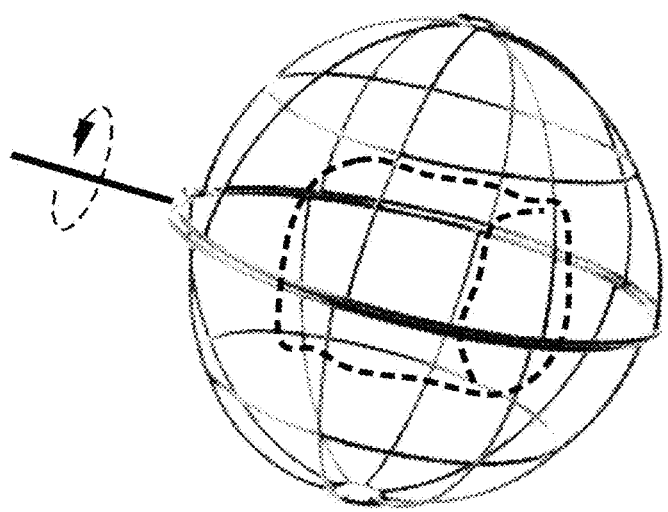
FIG. 34B shows a basket structure that is intentionally larger than the food item.

As mentioned, in all embodiments, alternative food holders may also be used in place of a fork, including the basket shown in FIG. 34. The inside of the basket may hold the food item snugly (FIG. 34A), or the basket structure may be intentionally larger than the food item (FIG. 34B), such that the food item 'tumbles' during operation for additional random exposure to heat.

Figure 35:
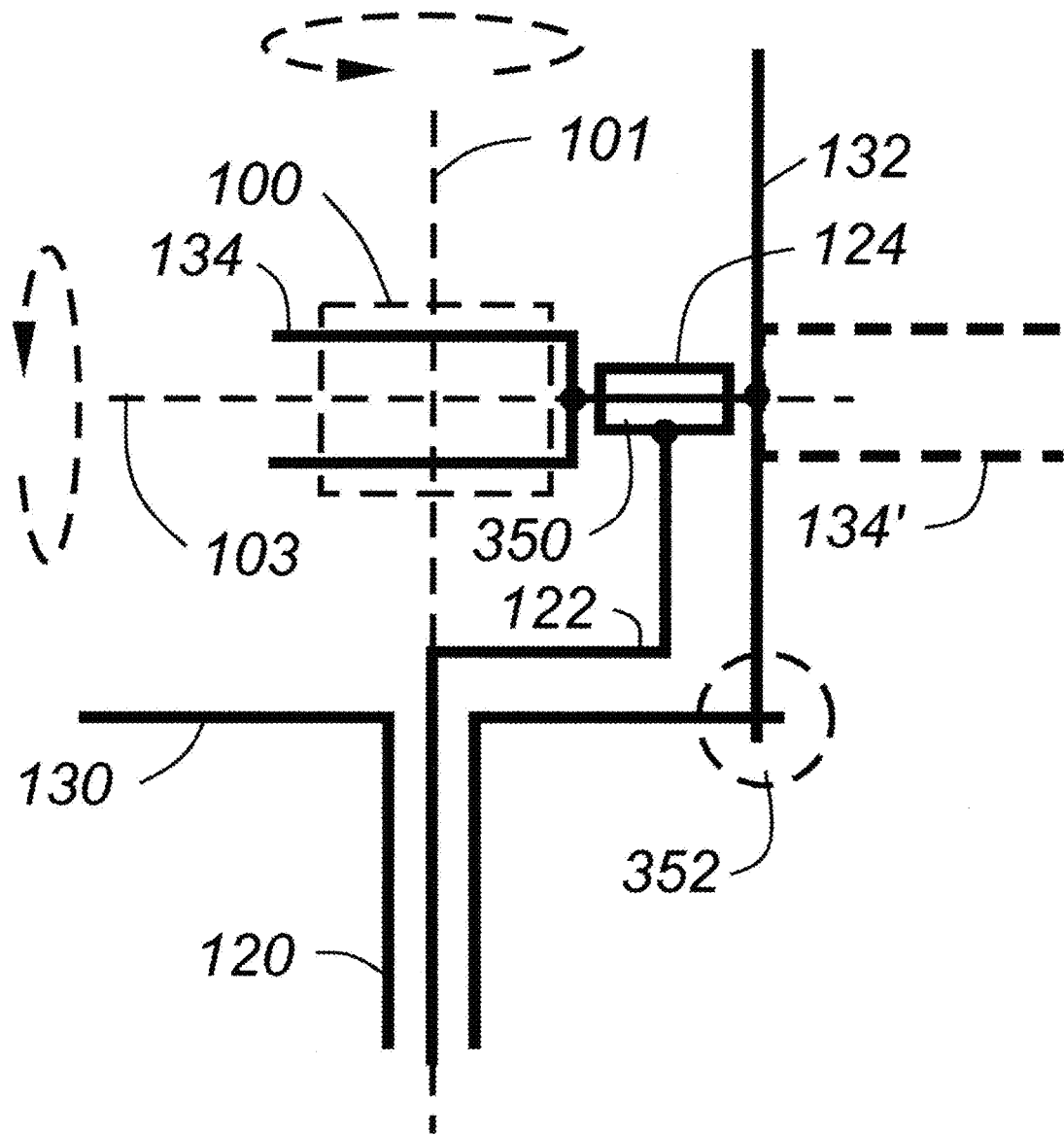
FIG. 35 is a schematic diagram used to depict alternative embodiments of the invention.

The diagram of FIG. 35 shows the head unit of FIGS. 28, 29 in a schematic form that will be used to describe alternative embodiments according to the invention. Gears 130, 132 are shown as lines, and area where the lines cross at 352 depicts meshing. Rigid connections are shown with dots, i.e., 350, and axes or rotation are shown in broken-line form. Thus, in this embodiment, a food item (not shown) simultaneously rotates about a first axis 123 and a second axis 135. As mentioned, these axes may be orthogonal to one another. Note that an additional fork 351 or food item holder may be coupled to gear 132.

Figure 36:
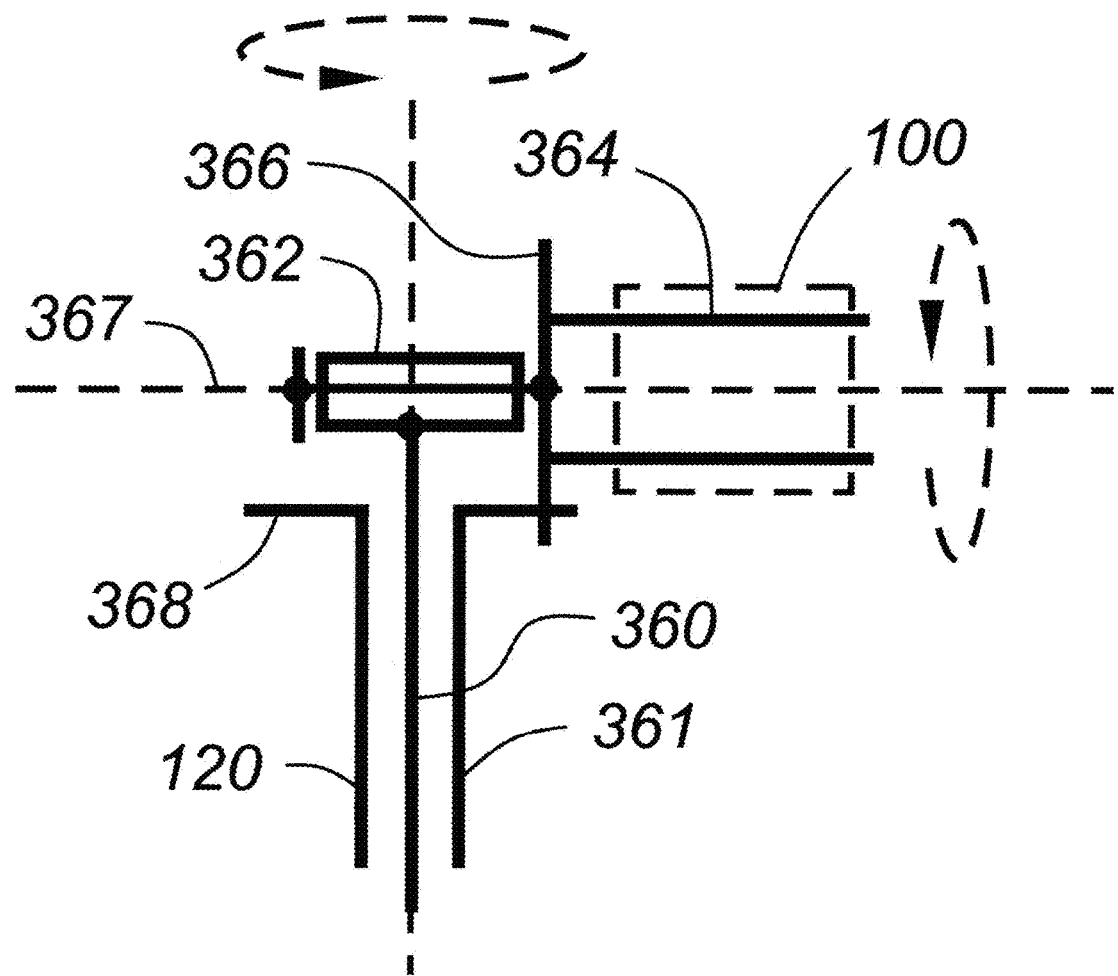
FIG. 36 shows a different gear arrangement.

In the embodiment of FIG. 36, the fork 364 or food item holder is coupled to gear 366. Rotating rod 360 may come straight out of tube 361 for connection to sleeve 362. In this case, the food item rotates about the axis defined by rod 360 in a plane perpendicular to the rod, while simultaneously rotating about axis 367, which extends radially outwardly from the central axis of rod 360.

Figure 37:
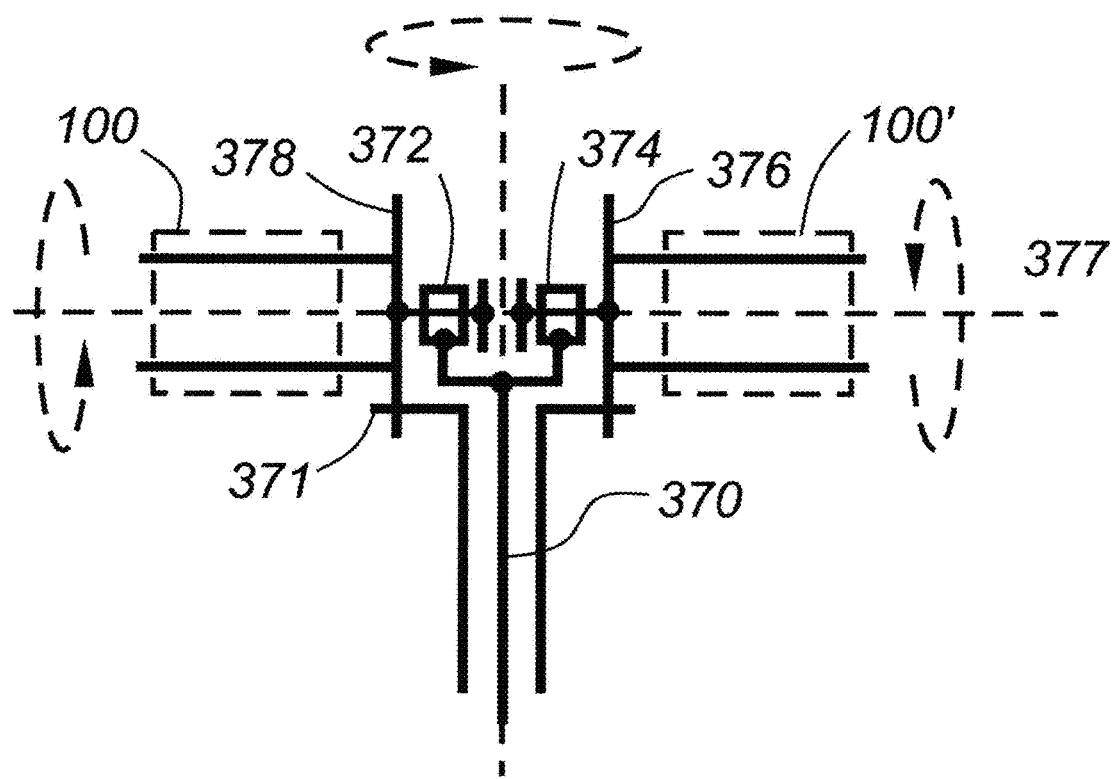
FIG. 37 illustrates multiple food items holders based upon the arrangement of FIG. 36.
Figure 38:
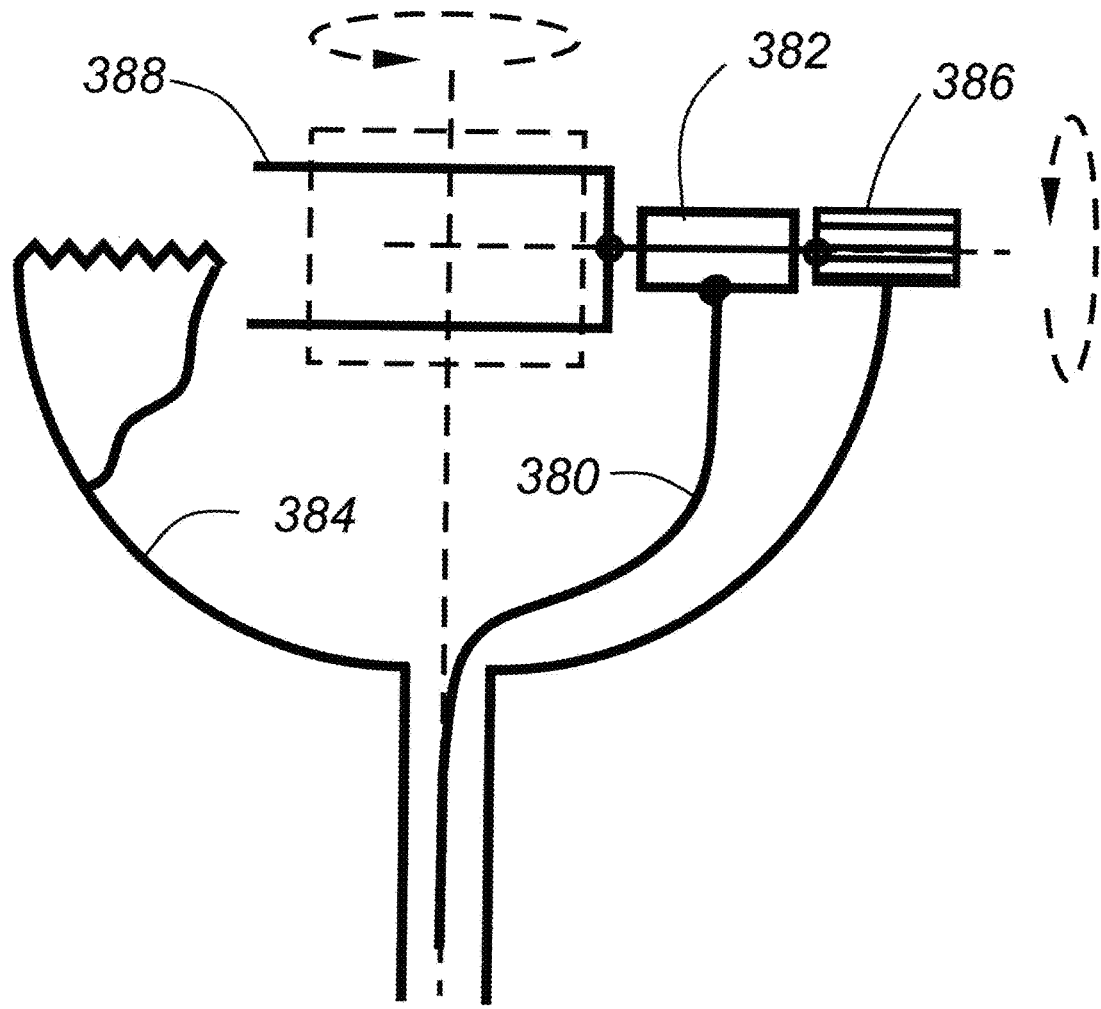
FIG. 38 shows the use of a cup-shaped structure.

FIG. 37 shows how multiple food holders may be accommodated using the design of FIG. 38. Specifically, a transverse rod 370, journaled through sleeve 372, may connect to opposing gears 376, 378 with respective food holders such a fork 374. While only two opposing gears/food holders are shown, more than two gears/food holders may be provided through a spoke-like arrangement. For example, 3, 4, 5 or six gears/food holders may mesh with gear 371 depending upon relative gear sizes.

Figure 39:
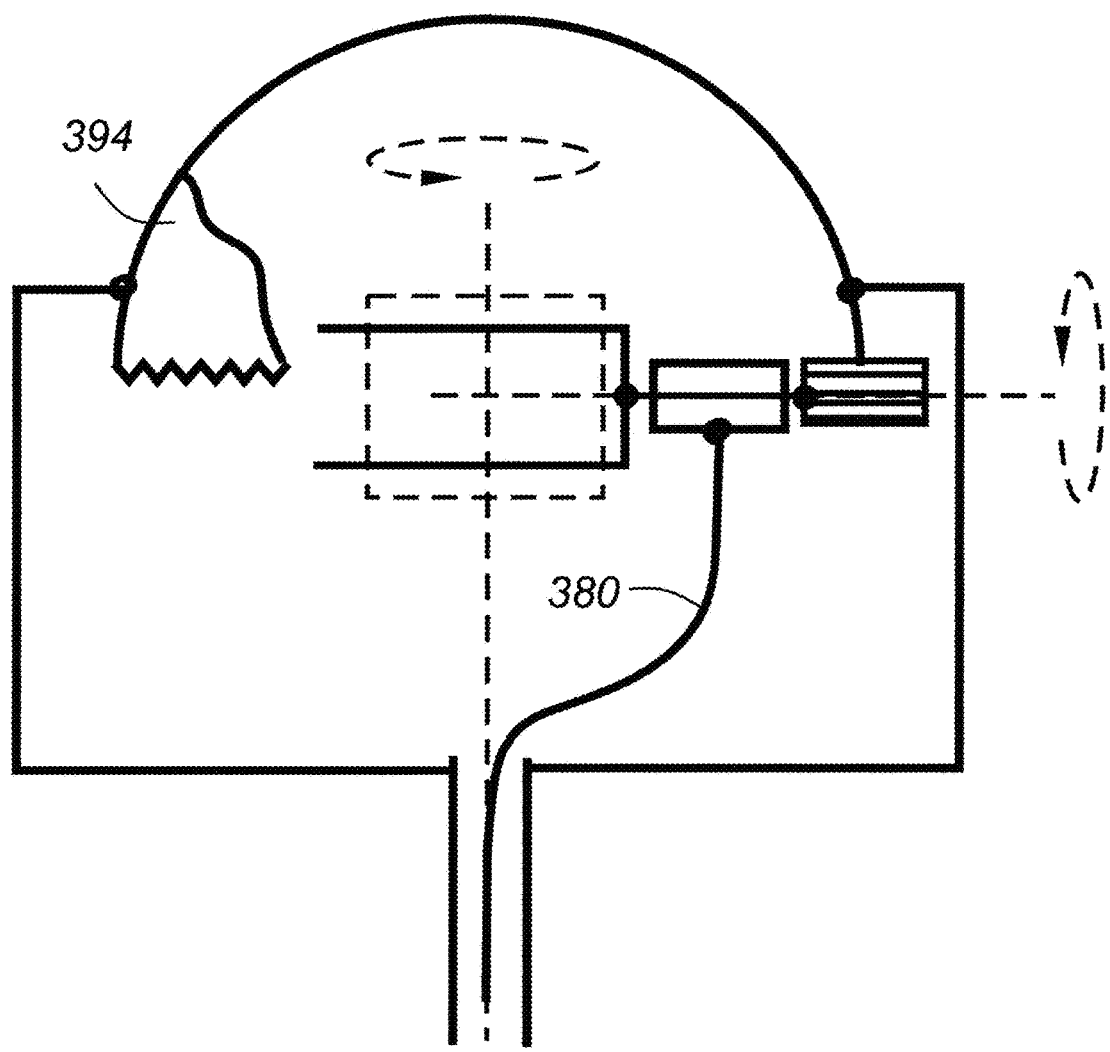
FIG. 39 depicts an alternative cup-shaped structure placement.
Figure 40:
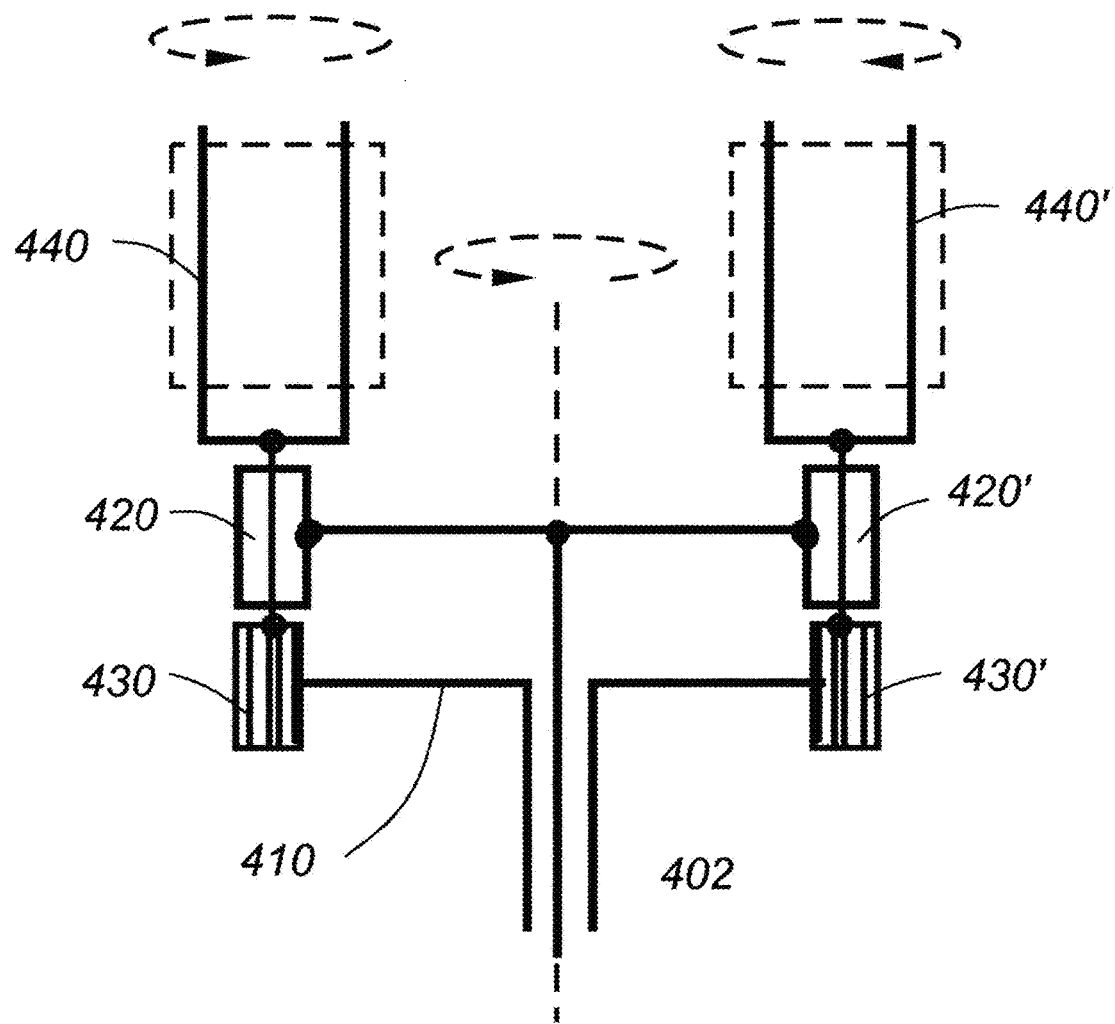
FIG. 40 illustrates an embodiment wherein one or more food item holders spin on axes parallel to the axis of the elongated hollow rod.
Figure 41:
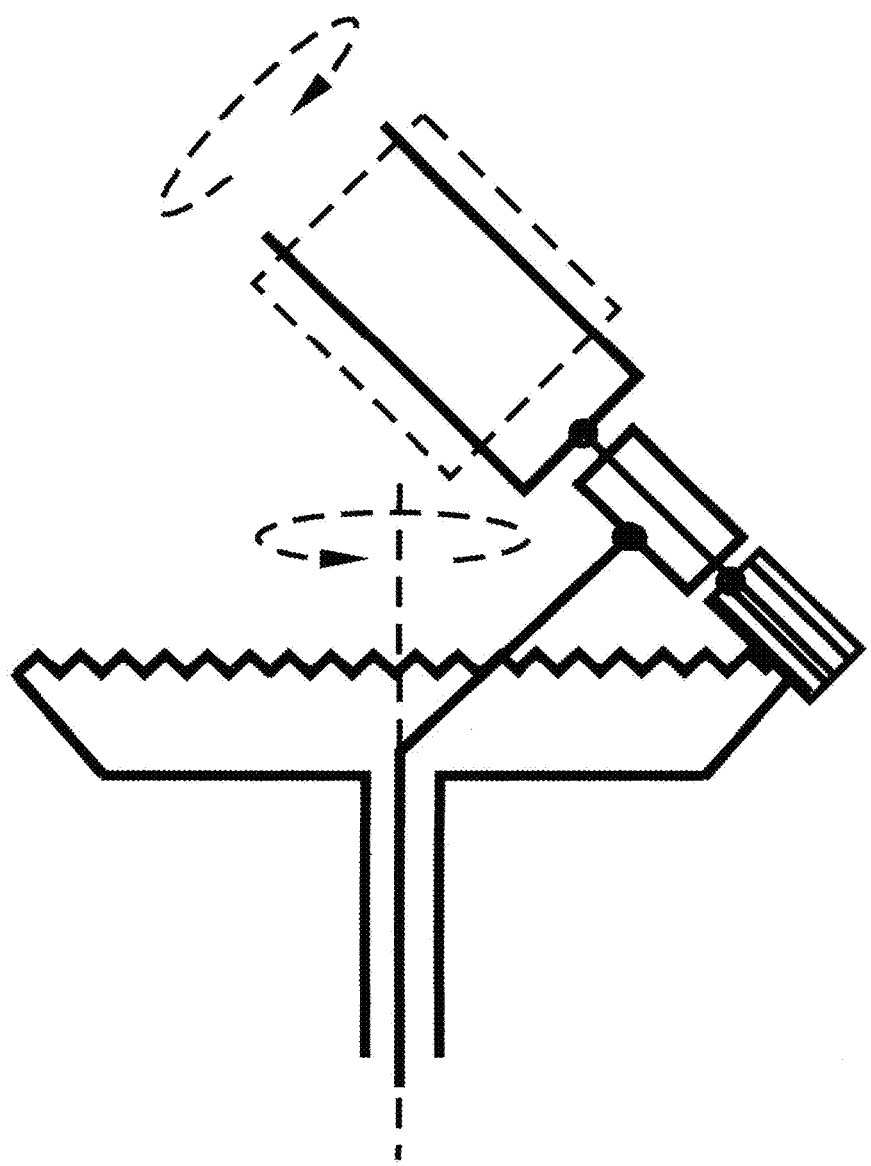
FIG. 41 demonstrates that the multiple angles used with the invention need not be right angles.

The embodiment of FIG. 38 uses a cup-shaped structure 384 terminating in a tooted distal edge that meshes with a spur gear 386 coupled to a food holder 388 through a sleeve 382. The cup-shaped structure 384 may be solid or perforated. An advantage to this configuration is that the inside concave surface may be spherical, parabolic or hyperbolic and reflective to concentrate or focus heat toward the food item. As shown in FIG. 39, a cup-shaped structure 394 may be flipped from the position shown in FIG. 38 for better visibility of the food item during cooking. FIG. 40 illustrates an embodiment wherein one or more food item holders spin on axes parallel to the axis of the elongated hollow rod, and FIG. 41 demonstrates that the multiple angles used with the invention need not be right angles, including angles between zero and 90 degrees.

Although the embodiments disclosed herein have focused on marshmallows, one of skill in the art will appreciate that the invention is equally applicable to other food items, including wieners, dogs, brats and so forth, as well as veggies, etc. With a basket replacement for the folk, chestnuts may also be evenly roasted using the apparatus disclosed herein.

The invention claimed is:

1. Apparatus for cooking a food item, comprising:
an elongate hollow tube having proximal and distal ends;
a rod having proximal and distal ends disposed within the elongate hollow tube;
a device coupled to the proximal end of the rod to rotate the rod about a first axis of rotation;
a first gear attached to the distal end of the elongate hollow tube;
a second gear, coupled to the distal end of the rod, that meshes with the first gear and rotates about a second axis of rotation that is different from the first axis of rotation; and
a food item holder attached to the second gear, such that when the rod rotates about the first axis of rotation, the food item holder simultaneously rotates about the first and second axes of rotation.

2. The apparatus of claim 1, wherein:
the distal end of the rod includes a bent portion terminating in a sleeve with a bore defining the second axis of rotation; and
the second gear is attached to a second rod disposed within the sleeve.

3. The apparatus of claim 2, wherein:
the second rod has opposing ends that protrude from the sleeve; and
the second gear is connected to one end of the second rod and the food item holder is connected to the other end of the second rod.

4. The apparatus of claim 2, wherein:
the second rod has opposing ends that protrude from the sleeve; and
the second gear and the food item holder are connected to the same end of the second rod.

5. The apparatus of claim 1, wherein the first and second axes of rotation are perpendicular to one another.

6. The apparatus of claim 1, wherein the first and second gears are flat with square, trapezoidal, or wavy teeth.

7. The apparatus of claim 1, wherein:
the first gear is cup-shaped, having a rim with teeth and a concave surface facing toward the food item holder; and
the second gear is a spur gear that meshes with the teeth on the rim of the cup.

8. The apparatus of claim 1, including a plurality of second gears that mesh with the first gear, each second gear being coupled to a respective food item holder.

9. The apparatus of claim 1, wherein;
the food item holder rotates about the first axis of rotation in a plane perpendicular to the first axis of rotation; and
the second axis of rotation extends radially outwardly from the first axis of rotation.

10. The apparatus of claim 1, wherein the device coupled to the proximal end of the rod to rotate the rod about a first axis of rotation is a hand crank.

11. The apparatus of claim 1, wherein the device coupled to the proximal end of the rod to rotate the rod about a first axis of rotation is a motor.

12. The apparatus of claim 1, wherein the device coupled to the proximal end of the rod to rotate the rod about a first axis of rotation is a squeeze grip coupled to a ratcheting mechanism.

13. The apparatus of claim 1, wherein the food item holder is a fork.

14. The apparatus of claim 1, wherein the food item holder is a wire cage or basket.

15. The apparatus of claim 1, wherein gear ratio between the first and second gears is 1:1.

16. The apparatus of claim 1, wherein gear ratio between the first and second gears is less than or greater than 1:1.

17. The apparatus of claim 1, wherein;
the food item holder rotates about the first axis of rotation in a plane perpendicular to the first axis of rotation; and
the second axis of rotation is parallel to the first axis of rotation.

18. The apparatus of claim 1, wherein the first and second axes of rotation define an angle between 0 and 90 degrees.

* * * * *